(12) United States Patent
Gataullin et al.

(10) Patent No.: US 8,966,452 B2
(45) Date of Patent: Feb. 24, 2015

(54) USER INTERACTION ANALYSIS OF TRACER DATA FOR CONFIGURING AN APPLICATION TRACER

(71) Applicant: Concurix Corporation, Kirkland, WA (US)

(72) Inventors: Renat Gataullin, Toronto (CA); Alexander G. Gounares, Kirkland, WA (US); Christopher W. Fraser, Seattle, WA (US)

(73) Assignee: Concurix Corporation, Kirkland, WA (US)

( * ) Notice: Subject to any disclaimer, the term of this patent is extended or adjusted under 35 U.S.C. 154(b) by 155 days.

(21) Appl. No.: 13/916,568

(22) Filed: Jun. 12, 2013

(65) Prior Publication Data

US 2014/0317605 A1    Oct. 23, 2014

Related U.S. Application Data

(63) Continuation-in-part of application No. 13/867,057, filed on Apr. 20, 2013.

(51) Int. Cl.
*G06F 9/44*    (2006.01)
*G06F 11/36*   (2006.01)
*G06F 11/34*   (2006.01)
*G06F 11/32*   (2006.01)

(52) U.S. Cl.
CPC .......... *G06F 11/3636* (2013.01); *G06F 11/323* (2013.01); *G06F 11/3466* (2013.01); *G06F 2201/865* (2013.01)
USPC ....................................... 717/128

(58) Field of Classification Search
CPC ................................. G06F 11/3466
USPC ......................................... 717/128
See application file for complete search history.

(56) References Cited

U.S. PATENT DOCUMENTS

| 7,827,539 B1 * | 11/2010 | Wygodny et al. ............. 717/128 |
| 2002/0138788 A1 | 9/2002 | Yenne et al. |
| 2002/0199172 A1 * | 12/2002 | Bunnell ........................ 717/128 |
| 2008/0127108 A1 | 5/2008 | Ivanov et al. |
| 2008/0127112 A1 * | 5/2008 | Kettley et al. ................. 717/128 |
| 2008/0155348 A1 | 6/2008 | Ivanov et al. |
| 2008/0155349 A1 | 6/2008 | Ivanov et al. |

(Continued)

OTHER PUBLICATIONS

"Method and System for Automatically Tracking User Interactions and Providing Tags to the User Interactions"; An IP.com Prior Art Database Technical Disclosure; Dec. 4, 2010.*

(Continued)

*Primary Examiner* — Anna Deng
*Assistant Examiner* — Clint A Thatcher
(74) *Attorney, Agent, or Firm* — Aeon Law; Adam L.K. Philipp

(57) ABSTRACT

A tracing system may be updated to include, exclude, or modify tracing configurations for functions based on how a user consumes tracing results. The user's interactions with graphical representations, inspections of data, and other interactions may indicate which functions may be interesting and which functions may not be. The user's interactions may be classified by use, such as during debugging, performance testing, and ongoing monitoring, and multiple user's interactions with the same function, library, module, source code file, or other groups of functions may be combined to predict a user's interest in a function.

18 Claims, 12 Drawing Sheets

(56) References Cited

U.S. PATENT DOCUMENTS

| | | |
|---|---|---|
| 2009/0089765 A1 | 4/2009 | Guo et al. |
| 2011/0289485 A1 | 11/2011 | Mejdrich et al. |
| 2012/0204156 A1 | 8/2012 | Kettley et al. |
| 2013/0061212 A1 | 3/2013 | Krause et al. |
| 2014/0215444 A1* | 7/2014 | Voccio et al. .................. 717/128 |

OTHER PUBLICATIONS

International Search Authority, International Search Report and Written Opinion, Korea Intellectual Property Office, PCT/US2014/011727.

* cited by examiner

USER INTERACTION ANALYSIS OF TRACER DATA FOR CONFIGURING AN APPLICATION TRACER

CROSS REFERENCE TO RELATED APPLICATIONS

This patent application claims benefit of and priority to U.S. patent application Ser. No. 13/867,057 entitled "Tracing Closures in a Callback Environment" filed 20 Apr. 2013, the entire contents of which are hereby expressly incorporated by reference.

BACKGROUND

Application tracing is one mechanism to understand and monitor an application. Tracing is a mechanism to collect data while the application executes. In some uses, application tracing may be used for monitoring the ongoing performance of an application. In other uses, application tracing may be used by a developer to understand an application, identify any problems, and improve the application.

SUMMARY

An automated tracing system may create wrapping functions for each function in an application, including callback functions that may be passed as arguments to or from a given function. The wrapping function may include tracing data which may be used to generate a topology of the application, as well as other tracing data which may be used for performance measurements. In many cases, the wrapping function may be at least partially isomorphic with respect to the inner function being wrapped.

A tracing system may use an evaluation mechanism to determine which functions to include or exclude during tracing. The architecture may evaluate functions when functions or groups of functions may be loaded for execution, as well as each time a function may be encountered. The evaluation mechanism may use whitelists, blacklists, and various expressions to identify which functions to trace and which functions to exclude. The evaluation mechanism may evaluate an expression that may identify specific conditions under which a function may be traced or not traced. The tracing mechanism may create wrapping functions for each function, including callback functions.

A tracing system may use different configurations for tracing various functions in different manners. A configuration may be a group of settings that may define which data elements to collect, as well as the manner in which the data may be summarized, stored, and in some cases, displayed. Example configurations may include debugging configuration, performance optimization configuration, long term monitoring configuration, and others. The tracing system may be able to trace one group of functions with one configuration, while tracing another group of functions in the same application using a different configuration.

Real time analysis of tracing data may identify functions for which tracing may be enhanced or reduced. A tracer that generates function-level data may have an aggregator that summarizes the data. Potential changes to tracing configuration may be identified by analyzing the summarized data to determine whether or not each function is being traced at a level commensurate with that function's impact to the summarized data. Those functions with little significant contribution may have their tracing reduced, while those functions with more significant contribution may have their tracing enhanced. The analysis of the summarized data may be performed in real time in some instances, causing a tracer to change the data collected while an application executes.

A tracing system may be updated to include, exclude, or modify tracing configurations for functions based on how a user consumes tracing results. The user's interactions with graphical representations, inspections of data, and other interactions may indicate which functions may be interesting and which functions may not be. The user's interactions may be classified by use, such as during debugging, performance testing, and ongoing monitoring, and multiple user's interactions with the same function, library, module, source code file, or other groups of functions may be combined to predict a user's interest in a function.

Error logs, bug reports, and other databases identifying problems with a tracer system may be mined to determine how a tracer may interact with a given function, module, or other group of functions. Based on such reports, a tracer may be configured to avoid certain functions or to trace such functions in a specific manner. In some cases, tracer may be configured to limit tracing to certain parameters or with other limitations to avoid any known conditions under which errors occur.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
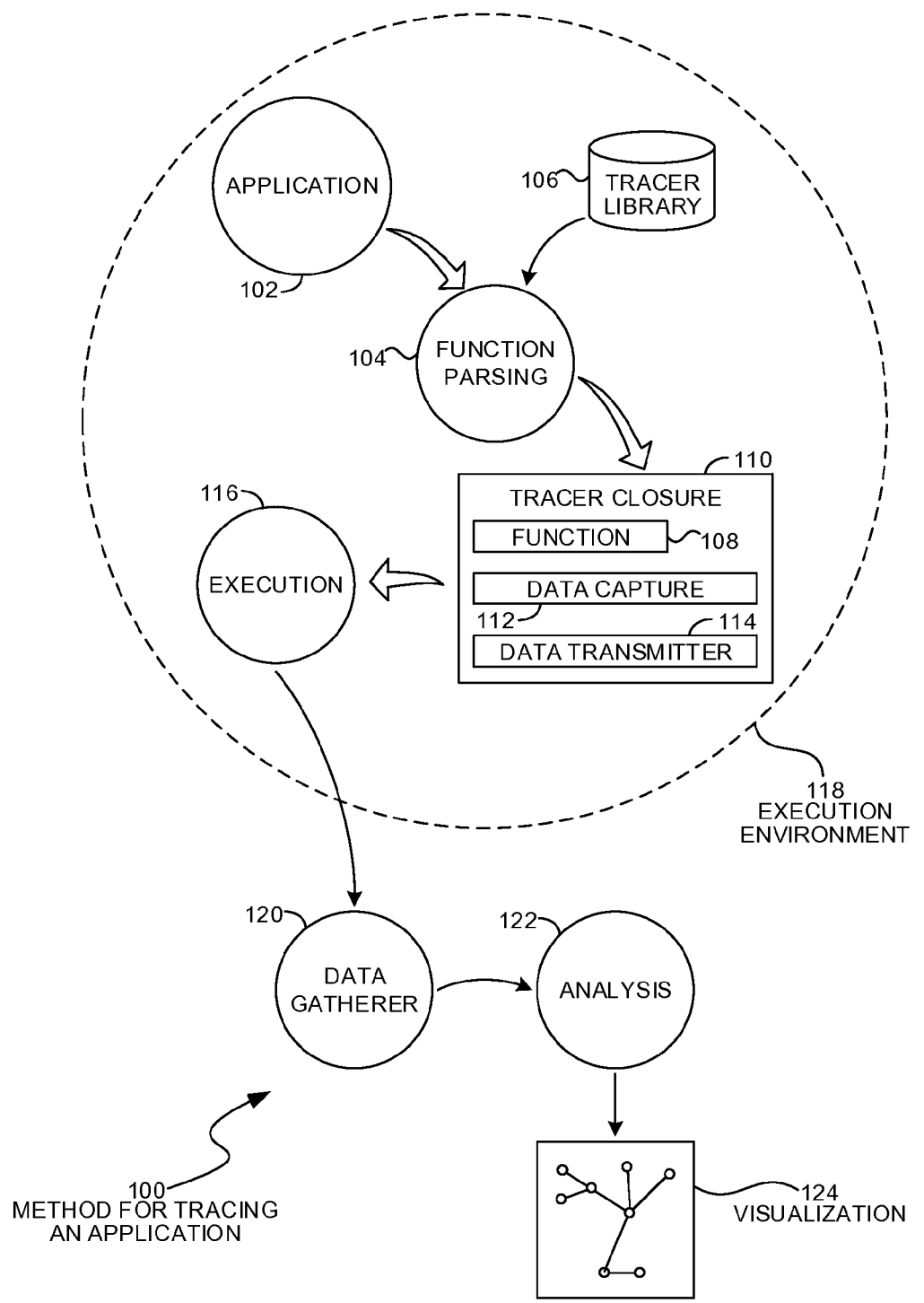
FIG. 1 is a diagram illustration of an embodiment showing a method for tracing an application using tracing closures.

Automated Wrapping in a Callback Programming Environment

An automated system may examine an application or computer program to identify functions within the application. As a function is identified, a tracing closure may be created that adds a call to a tracing function. An application may be recursively wrapped, function by function, with tracing closures that capture each function and gather performance and topology information about the application.

In many programming languages and execution environments where callbacks may be used, functions may be passed as arguments to and from a function, and functions may be added as properties of functions, memory objects, or other elements. In such environments, an automated system may identify each function and wrap each function in a tracing closure.

A tracing closure may include information that may be useful for performance monitoring of an application. Such information may include start and stop times for a function, resources consumed by the function, work accomplished by the function, garbage collection performed, or other parameters. The resources consumed by the function may be processor resources, memory resources, network resources, peripheral device resources, or other resources. One example of a performance metric may be the amount of work accomplished per unit time, which may reflect 'busy-ness' or efficiency of a specific function.

A tracing closure may include caller information. Caller information may include identifiers for a higher level function that may have called the wrapped function. Such information may retrieved from a call stack and may be added to tracing information. A topology of an application may be created by joining together the various functions invoked by the application.

The tracing closure may include a projection of various properties of the wrapped function. In many cases, a function being wrapped may have various properties associated with it, and by projecting the wrapped function's properties to the tracing wrapper, any downstream functions may properly handle the wrapped function.

The automated tracing system may be used at runtime to identify functions as those functions are called, wrap the functions with a tracing closure, and collect tracing data while the application executes. Such a system may be able to trace every function or a subset of functions that may be of interest, and may apply the tracing closures automatically without causing a programmer to modify their code.

The automated tracing system may be implemented as a library or code library. The automated tracing system may examine an application at run time, apply the various tracer closures, and cause the application to execute. The tracing closures may gather information that may be passed to a tracer manager, which may process the data and store the data for visualizations or various analyses.

The automated tracing system may be implemented in any language or execution environment where closures may be constructed. Some languages may support closures explicitly, while other languages may enable implied closures to be implemented using various programming constructs. Examples where the automated tracing system may be used include Node.JS and other programming languages and frameworks.

Tracer List for Automatically Controlling Tracer Behavior

An automated tracing system may evaluate which functions to trace and which functions not to trace. Such a system may trace a specific function under one set of conditions but not trace the same function under a different set of conditions. The evaluation mechanism may include whitelists, blacklists, or arbitrary expressions that may be evaluated to determine whether or not to trace a given instance of a function.

The tracing system may monitor each time a function may be loaded prior to execution, as well as each time a function may be called. An evaluation mechanism may be executed prior to each function call to determine whether or not to trace the given function. When the function may be selected for tracing, the tracer may monitor the function's execution and gather data for the function. When the function may not be selected for tracing, the function may be executed without the tracer.

In many embodiments, the tracing operations may add considerable overhead to the execution of an application. In some instances, tracing may consume 2×, 5×, 10×, or even more resources than the application being traced. Tracing may also generate large amounts of data that may be difficult to transmit or otherwise process. In one use scenario, a tracer may be run without consuming an excess amount of resources by eliminating a subset of functions from tracing.

In another use scenario, tracing may be applied to a subset of functions that may be interesting to a user. For example, a developer may wish to trace only a subset of an application on which the developer may be currently working, but may not wish to view tracing data from other portions of the application for which the developer may not be responsible. In such an example, the developer may specify that only the interesting functions be traced, while excluding the portions that may be uninteresting.

In still another use scenario, tracing may be turned on or turned off based on external factors. For example, tracing may be turned off or scaled back during periods of high loads or when performance may be desired, but tracing may be expanded during slower periods when more resources may be available.

Multiple Tracer Configurations Applied on a Function-by-Function Level

A tracer system may have multiple tracer configurations that may be applied to different functions while tracing an application. The tracer system may apply one configuration to one function and a separate configuration to another function, where the configurations define what data may be collected and how those data may be processed, stored, and visually represented.

The configurations may reflect different use cases for a tracer. For example, one configuration may be a debugging configuration, which may collect data useful for a programmer to determine how an application may function. A second configuration may be a performance testing configuration, which may collect a different set of data that may identify bottlenecks or other performance factors in an application. A third configuration may be a monitoring configuration, which may collect still another set of data that may be used to monitor the long term performance of a production application.

In each case, a configuration may reflect a specific set of data that may be collected. In some embodiments, a configuration may also include mechanisms for summarizing, collating, or otherwise processing the data into statistics representing the data. A configuration may also include sets of visualizations, tabular output, or other mechanisms through which a user may consume and examine the results.

The tracer may be capable of applying different configurations within a single application. For example, a tracer may apply a detailed debugging configuration to a specific module or group of functions that may be of particular interest, and may apply a lightweight debugging configuration to the remainder functions in the application. The results may include detailed data and analysis of the functions of interest, with other, more limited results from other functions.

Real Time Analysis of Tracer Summaries to Change Tracer Behavior

A tracer system may evaluate functions for increased or decreased tracing by evaluating the contributions of functions to summary statistics. When functions have small effects on certain statistics, the tracing of those functions may be minimized or reduced. When functions have larger effects on certain statistics, the tracing of those functions may be enhanced or increased.

Many tracing systems may gather raw data and summarize the raw data into statistics that represent the raw data. The statistics may then be stored, processed, visualized, or otherwise consumed, however the raw underlying data may be discarded.

The collection of the raw underlying data can adversely affect the performance of an application, causing an application to run slowly or consume vast amounts of resources. In some cases, tracing may add 5 to 10 times as many instructions to a single function, and fully instrumenting an application may be prohibitively expensive.

The tracing system may use a mechanism to determine which functions may be traced and the configuration with which to trace each function. The mechanism may be updated while the application is executing and while tracing the application. Such a system may enable to tracer to change behavior dynamically, while the application executes.

The tracing of a function may change in several different manners. One change may be to increase or decrease the amount of data collected for a particular function. For example, a suite of data collected for a function may include resource related data points, performance related data points, memory object data points, or other types of data. By limiting the amount of data collected for a particular function, the tracing overhead for the function may be minimized.

Another change may be to increase or decrease the frequency of data collection. Many tracers may collect and summarize data on a periodic interval, and some embodiments may limit certain data points to being collected on a sampling basis that may be less than every interval.

When a function is undergoing a lightweight tracing level and a determination is made to increase the tracing level, there may be a lag time in collecting data for the function. During a period of lightweight tracing, certain data items may not be collected. There may be a period of time between a determination is made that more extensive tracing is indicated and when the data may actually be collected.

User Interaction Analysis of Tracer Data for Configuring an Application Tracer

A tracing system may analyze user interaction with tracer data to classify a user's interest in the data. Those data elements with low user interest may be traced as a reduced tracing level, while those data elements with high user interest may be traced at an enhanced tracing level.

The tracing system may gather user interactions over multiple types of visualizations or other analyses, and may also aggregate multiple user's interactions with trace data from the same application as well as aggregating interactions with multiple different applications.

The user interactions may infer the relative interest in a specific function or group of functions. An interaction such as collapsing a group of functions into a small representation in a visualization may be one example of an interaction that indicates a low user interest. Another interaction where a user drills into a dataset to examine details of a group of functions may indicate a high user interest.

When functions or groups of functions may be identified as high or low level of interest, the tracing of the functions may be adjusted to collect and summarize data accordingly. One mechanism for communicating such identifiers may be a tracer list or other database that may be updated after analysis of user interactions.

The user's level of interest in certain functions may change based on a user's use model of the data. A user who may be debugging an application may examine certain functions in detail, but may use the data in a different manner when doing performance tuning or some other use of the data.

A tracing system may factor the user interactions by an express or implied use of the data. In some cases, a user may be explicitly asked to identify a category or classification that reflects the user's current activities. In other cases, the user's activities may be implied by the analyses performed, the types of visualizations explored, or other activities.

Many embodiments may include a user classification that may relate to a user's goals or objectives for interacting with the tracer data. The user classification may be general types of uses of the data, such as for debugging, performance tuning, or long term monitoring. In some cases, the classification may be uses of the data for a specific project or for a team or company that may have specific types of interactions that may apply to the project, team, company, or other group.

In some cases, the classification may be a specialized classification that may be learned or enhanced over time. A new classification may be created by identifying user interactions associated with the classification, then analyzing the user interactions to identify preferences or interest levels for each of the functions or groups of functions. An existing classification may be enhanced by adding additional user interactions within the classification, then performing additional analysis.

The user preferences may be used as an initial configuration of a tracer or analysis mechanism given a user's classification. The initial configuration may serve as a starting point from which a user may modify the tracer to enhance or reduce activities regarding specific functions.

Error List and Bug Report Analysis for Configuring an Application Tracer

A tracer system may be configured based on errors or bugs that may have been encountered during previous tracer runs. Various databases may contain error reports, bug reports, or other abnormalities that may be analyzed to determine conditions under which tracing may be suspended or performed in a specific manner. In some cases, the tracing may be performed in a reduced manner, while in other cases, the tracing may not be traced at all for a specific function or group of functions.

The tracer system may use various mechanisms to determine which function to trace and how to trace those functions. One input to such a system may be errors, bug reports, and other information that may be gathered during previous runs. In general, an error or bug report may indicate conditions under which the tracing operation may have failed, and tracing may therefore be reduced or eliminated on subsequent tracing attempts. Such a system may be one example of a system that may automatically learn or adapt as multiple uses of the system are gathered and analyzed.

The tracer system may collect bugs or errors and may log those events in a database. The database may be any form of storage mechanism that may be queried when a function may be encountered to determine whether to trace the function and how tracing may be deployed for the function.

In some cases, an error or bug report may indicate specific features or conditions under which tracing may not operate as intended. In such cases, the tracer system may still be able to trace a function, but in a manner that may not invoke the error condition. In some cases, the error or bug report may not have sufficient information or may indicate that no tracing may be appropriate for a given function.

The error or bug reports may identify a specific function or group of functions for which tracing may have failed. The group of functions may be defined in a module, file, library, service, or other group of functions.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a tracing method that may automatically wrap functions with tracer closures, then executes the wrapped functions to gather tracer data while an application executes.

Embodiment 100 illustrates a broad view of a method that may be used to automatically instrument and execute an application to collect tracer data. The tracer data may then be processed to generate various analyses, such as visualizations of the data.

The method of embodiment 100 may begin with an application 102 and a routine that parses functions 104. As each function may be encountered, a tracer closure 110 may encapsulate the function 108. The tracer closure 110 may include functions for data capture 112 and data transmittal 114.

The wrapped function 108 may be executed 116, and the data capture 112 and data transmitter 114 components may transmit tracer data to a data gatherer 120. An analysis engine 122 may analyze the tracer data in real time or later to produce various analysis, including visualizations 124 or other analyses.

A tracer library 106 may include executable code that may capture functions within the application 102 to apply the tracer closure 110. The tracer closure 110 may be a mechanism that encapsulates the function 108 so that data may be gathered while the function 108 executes.

In a typical embodiment, the tracer closure 110 may gather start time, end time, resource consumption data, objects passed into and out from the function, and various other data. The tracer closure 110 may have different data collection options based on the types of analysis that may be performed. In a monitoring system for a production application 102, tracer closures 110 may have lightweight amounts of data collection, while debugging and development the application 102 may have a large range of data that may be collected.

The tracer closure 110 may be created with a set of descriptors that may be gathered when the function 108 is called. The descriptors may include identifiers for the function 108 as well as the calling function or other metadata about the function. The descriptors may be carried in the tracer closure 110 and be provided to the data gatherer 120.

The data capture 112 component may gather identification information for each function. The identification information may include references that may help a developer identify the function being called, which may include a library name, function name, or other indicator. In some embodiments, a line number may be included to identify exactly where the function call may have originated in a program. Such information may be helpful in locating the program code for the function call.

The function identifiers may include unique identifiers for each instance of a function call. Some functions may be called very frequently, and some embodiments may include a globally unique identification (GUID) or other identifier for each independent instance of the function call. Other embodiments may not include a unique identifier, yet may include various other identifiers.

Call stack trace information may be included in some embodiments by the data capture 112 component. The call stack trace information may include identifiers for the function that called function 108. When the calling function metadata may be gathered by the tracer closure 110, an analyzer may be able to link function calls together for various analysis, including visualizations of the application's components that include the relationships between components.

The application 102 may be executed with the tracer library 106 in an execution environment 118. In some embodiments, the execution environment 118 may be a virtual machine, such as a process virtual machine or system virtual machine. In some cases, the execution environment 118 may include a framework that may process a subset of functions and may work in conjunction with the application 102. For example, a framework may process input/output requests or other functions that may have high latency, and the framework may be accessed using callbacks.

Callbacks may be executable code that may be passed as an argument to other code, which may be expected to execute the argument at a convenient time. An immediate invocation may be performed in the case of a synchronous callback, while asynchronous callbacks may be performed at some later time. Many languages may support callbacks, including C, C++, Pascal, JavaScript, Lua, Python, Perl, PHP, C#, Visual Basic, Smalltalk, and other languages. In some cases, callbacks may be expressly defined and implemented, while in other cases callbacks may be simulated or have constructs that may behave as callbacks. Callbacks may be implemented in object oriented languages, functional languages, imperative languages, and other language types.

The function parser 104 may identify callbacks as functions that may be wrapped using a tracer closure 110. The callbacks may be passed to a function or returned by a function. The automated function parser 104 may detect any function as that function may be invoked, and then wrap the function with a tracer closure.

In some cases, the automated function parser 104 may encounter a function that already contains a tracer closure 110. In such cases, the automated function parser 104 may determine that the tracer closure 110 has been applied and may not add another closure.

Throughout this specification and claims, the term "wrapper", "closure", "encapsulation", and similar terms are used to describe a programming technique where executable code in an application is monitored or managed. The executable code may be an application function or other block of application code. The wrapper or closure may be inserted between the calling function and the called function, and may itself call the called function. When inserted in an application, a tracer closure may perform some data collection at the start of a function and additional data collection when the function ends.

As a wrapper function, a tracer closure may be able to detect inputs and output of the wrapped function, as well as calls to other functions, normal or abnormal exits from the function, input values, output values, changes to state, or other interactions or behaviors of the wrapped function. Each of these types of data may be collected in various embodiments.

In one example of a debugging embodiment, the tracer closures may be configured to capture operations or interactions with a specific data type or data object. Each type the identified data objects may be accessed or changed, the tracer closures may capture the event and store the event for processing. In some cases, a flag or condition may be set that may pause the operation of the application so that a programmer may be able to investigate or query other data objects or check various states of the application.

The tracer closures 110 may generate a large amount of tracing data in some cases. Some embodiments may preprocess or aggregate the collected data prior to transmitting the data to a data gatherer. For example, an embodiment may use various time series techniques to maintain running averages or other summaries and statistics of the data, then transmit the summaries and statistics to a data gatherer 120. In another example, an embodiment may maintain counters that count various events and transmit the counter values at specific intervals to the data gatherer.

The tracer closures 110 may be applied to a subset of functions in some embodiments. Such embodiments may have a configuration file that may identify specific functions, types of functions, classes of functions, or other definitions of functions that may be included or excluded. Some embodiments may have heuristics or conditional expressions that may be evaluated to identify functions that may be included or excluded in the analysis.

Figure 2:
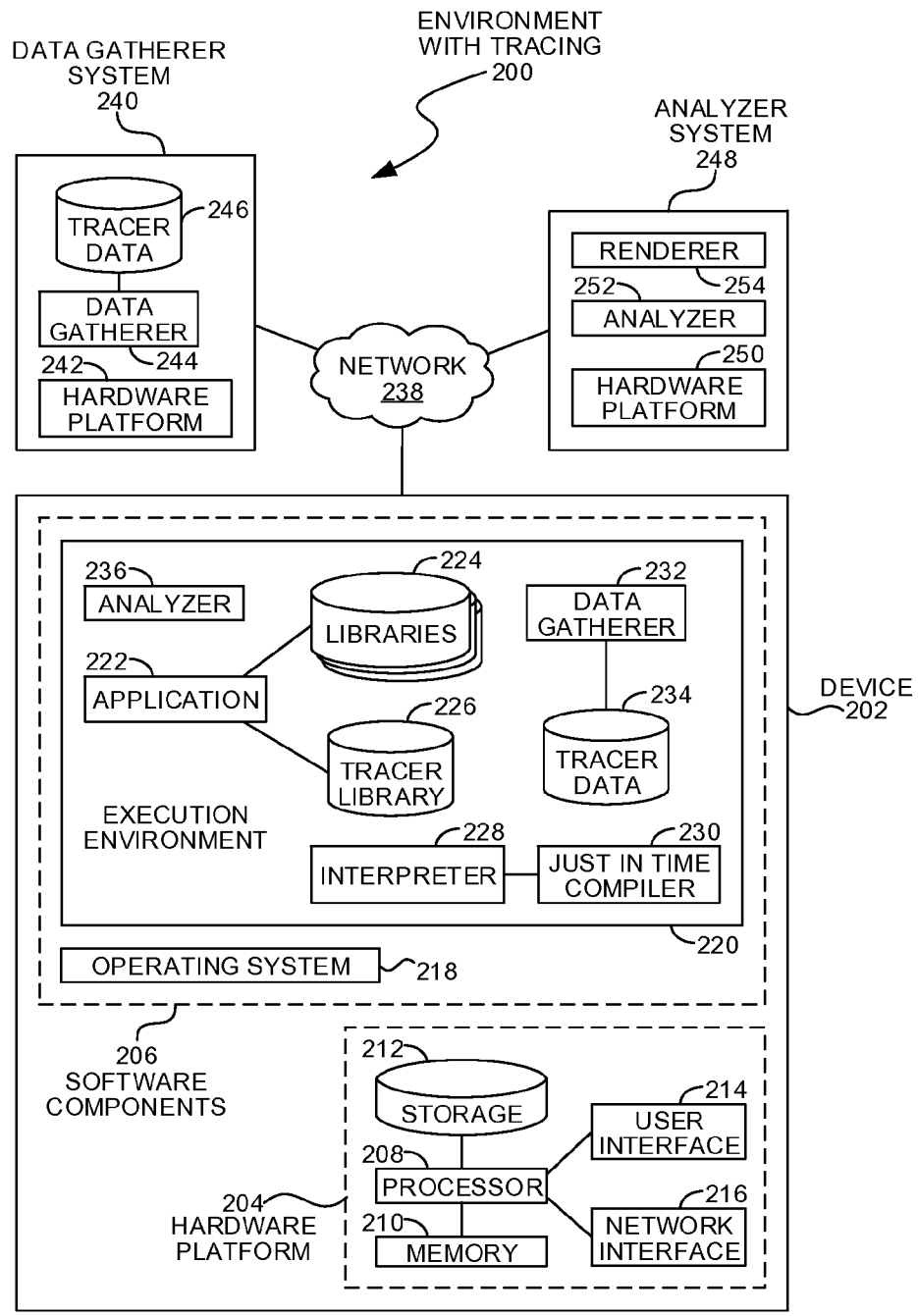
FIG. 2 is a diagram illustration of an embodiment showing a network environment with devices that may trace an application using tracing closures.

FIG. 2 is a diagram of an embodiment 200 showing components that may trace an application using tracer closures. Embodiment 200 contains a device 202 that may be a single device in which tracing may occur, as well as several devices that may perform tracing using remote data collection and analysis.

A single device architecture may gather tracer data, analyze the data, and graphically display the data or perform bottleneck detection.

A multiple device architecture may divide different components of the data gathering and analysis functions over different devices. The multiple device architecture may be one way to deliver complex tracing services without having to install and maintain all of the various tracing components on a single system.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

An execution system 220 may manage the execution of an application 222, which may interact with various libraries 224, including a tracer library 226. The execution environment 220 may be a defined environment in which the application 222 may be executed, an example of which may be a virtual machine, including a process virtual machine or system virtual machine. In another example, an execution environment may be an integrated development environment that may have an editor that displays and edits the code, a compiler, various debugger tools, and other components used by programmers. In some embodiments, the execution system 220 may be an ad hoc collection of various components within an operating system 218 that may facilitate execution of the application 222.

In some embodiments, the execution environment 222 may include components such as an interpreter 228 and just in time compiler 230. Some environments may have an interpreter 228 which may process source code or intermediate code to generate machine instructions. In some cases, an interpreter 228 may generate intermediate code that may be further compiled. A just in time compiler 230 may be a component that creates machine code at runtime from source code or intermediate code. Still other embodiments may have a compiler that creates machine code from source code or intermediate code, but may do so some time before execution.

When the application 222 may be run with the tracer library 226, functions within the application 222 may be wrapped with a tracer closure, and the tracer closure may collect data and send the data to a data gatherer 232, which may store the tracer data 234. An analyzer 236 may process the tracer data 234 into visualizations, reports, alerts, or other forms.

The example of device 202 and more particularly the components illustrated in the execution environment 220 may represent an embodiment where all of the tracing, data collection, and analysis may be performed by a single device. Other embodiments may have multiple devices that may perform subsets of the tracing, data collection, and analysis functions.

Such devices may be connected over a network 238. In one embodiment, a data gathering system 240 and an analyzer system 248 may perform data collection and analysis services, respectively.

The data gathering system 240 may operate on a hardware platform 242, which may be similar to the hardware platform 204. A data gatherer component 244 may collect tracer data 246 from one or many devices 202 where tracer closures are being applied. The analyzer system 248 may have a hardware platform 250 which may be similar to the hardware platform 204, on which an analyzer 252 and renderer 254 may execute.

In some embodiments, a single data gatherer system 240 may collect data from multiple devices on which applications may be traced. One such embodiment may be where the data gathering and analysis may be performed as a service to multiple clients. In such an embodiment, each client device may have an application 222 that may be executed with a tracer library 226, and each tracer closure may transmit data to a data gatherer system 240, which may store tracer data 246 collected from multiple client devices.

Some applications may execute across multiple devices. In such a case, each device may create tracer closures that may transmit tracer data to a centralized data gatherer 244. In some such embodiments, the tracer data may have synchronization information or other data that may allow the data gatherer 244 or the analyzer system 248 to correlate or otherwise relate data from multiple sources together. Such embodiments may enable reports, visualizations, and other analyses that may incorporate data from multiple client devices into a single view of an application or larger, multi-device system. In such embodiments, a device name or other identifier may be associated with each data element that may be stored in the tracer data 246.

An example of a multiple device embodiment may be an application that processes workloads over multiple devices. A high performance computing cluster with message passing is one example of such a system, where the application may be distributed across multiple processors and multiple devices. A computing cluster with load balancing capabilities may be another example of a multi-device implementation of an application. Multiple devices may be used to process workloads in series, such that work may be passed from one device to another in sequence. Multiple devices may also be configured to process workloads in parallel, where independent workloads may be processed separately by similar devices.

Figure 3:
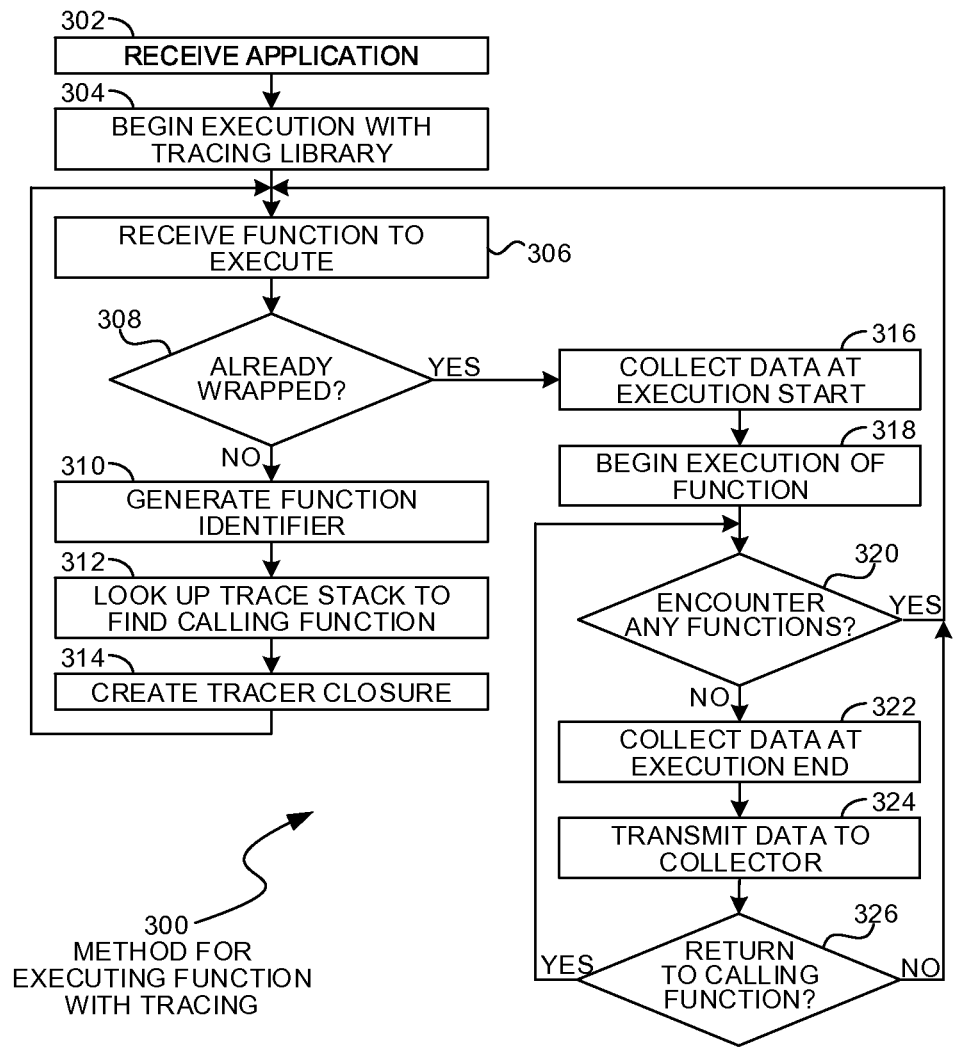
FIG. 3 is a flowchart illustration of an embodiment showing a method for executing application functions with tracing closures.

FIG. 3 is a flowchart illustration of an embodiment 300 showing a method for executing an application by wrapping functions. The operations of embodiment 300 illustrates the operations that may be contained in a tracer library and may be executed with an application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method that may identify each function within an application, then apply a tracer closure to wrap the function. At the time a tracer closure may be created, some data may be gathered about the context of the wrapped function, and data may also be gathered when the function begins and ends. Some embodiments may collect data at other points during the function execution.

An application may be received in block 302, and the application may begin execution with the tracing library in block 304.

A function may be identified in block 306 as being ready for execution. If the function has not yet been wrapped with a tracer closure in block 308, a tracer closure may be generated beginning in block 310.

A function identifier may be generated in block 310. The function identifier may include a human readable name for the function. For example, a function name as defined in source code may be used, and such a name may include a library name or other identifiers.

In many embodiments, an analyzer may attempt to concatenate or summaries calls to a specific function or group of functions. In such embodiments, the function identifiers may include names that may be common to each instance of the function called. A typical embodiment may include a text name taken from source code.

In some embodiments, the identifier may include unique identifiers for individual instances of a function. Such embodiments may store the unique identifiers as separate parameters within a tracer closure. The unique identifiers may be created by using incremental counters, globally unique identifiers (GUID), or other techniques to differentiate one instance of a function from another.

Such embodiments may enable various analyses that may track individual instances of certain functions through an application. Examples of such analyses may include bottleneck detection, tracing of individual workloads, or other analyses.

A lookup in a trace stack may be performed in block 312 to identify a calling function. When a calling function may be already wrapped with its own tracing closure, such a lookup may identify the calling function as one additional level up in the call stack. Such a situation may be useful in that the calling function identifier may refer to the calling function within the application, as opposed to the calling function being identified as a tracing closure.

The tracer closure may be created in block 314. The tracing closure may include some state that may include the identifiers for the function, the calling function, and other information. Such state may be passed to a data gatherer when the tracing closure collects and transmits tracing data.

After creating the tracing closure, the process may return to block 306. Now that the function is wrapped in block 308, data may be collected at the start of the function's execution in block 316.

The data collected in block 316 may include different information in different embodiments. In many embodiments, the data collected at the start of the function execution may include a timestamp. Some embodiments may also include parameters passed to the function, global variables, or other memory objects. Some embodiments may capture system state when the function begins. Such system state may include current processor load, network activity, or any other type of state that may exist when the function begins executing.

In some embodiments, a tracer closure may transmit data to a data collector at each stage where data may be collected. In the example of embodiment 300, data may be transmitted at the completion of a function. However, some embodiments may also transmit data to a data collector as part of block 316. Such data may be transmitted in parallel to beginning function execution in block 318 or before the function begins.

The function may begin executing in block 318. The function may be the actual executable code of the application that was wrapped with a tracer closure. As the function executes, if any function calls are encountered in block 320, the process may loop to block 306 to wrap the function and begin executing the new function. This loop may be performed multiple times recursively, with each newly encountered function being wrapped and added to the call stack.

The functions encountered in block 320 may include callback functions, which may be functions passed to the function being executed or returned by the function being executed.

When the wrapped function finishes execution, a set of data may be collected. The set of data may include a timestamp indicating when the function completed. Some embodiments may also include counters or other indicators of resources consumed by the function, data passed to or from the function, state of various memory objects, or any other data.

The data may be passed to a data collector in block 324. In some embodiments, various pre-processing or summarization may be performed prior to transmitting the data to a collector.

The data may be passed to a data collector that may be located on a remote device. In such a case, a tracer closure may cause a data transmission to occur across a network to a data gatherer. Some embodiments may include a local aggregator that may gather output from multiple tracer closures and transmit a group of datasets to a data gatherer over a network.

If the current function has been called from another function in block 326, the process may return to block 320 to continue execution of the calling function. The loop back to block 320 may be encountered for each calling function in a call stack at some point during execution.

When there is no calling function in block 326, the process may return to block 306 to begin executing another function in the application.

Figure 4:
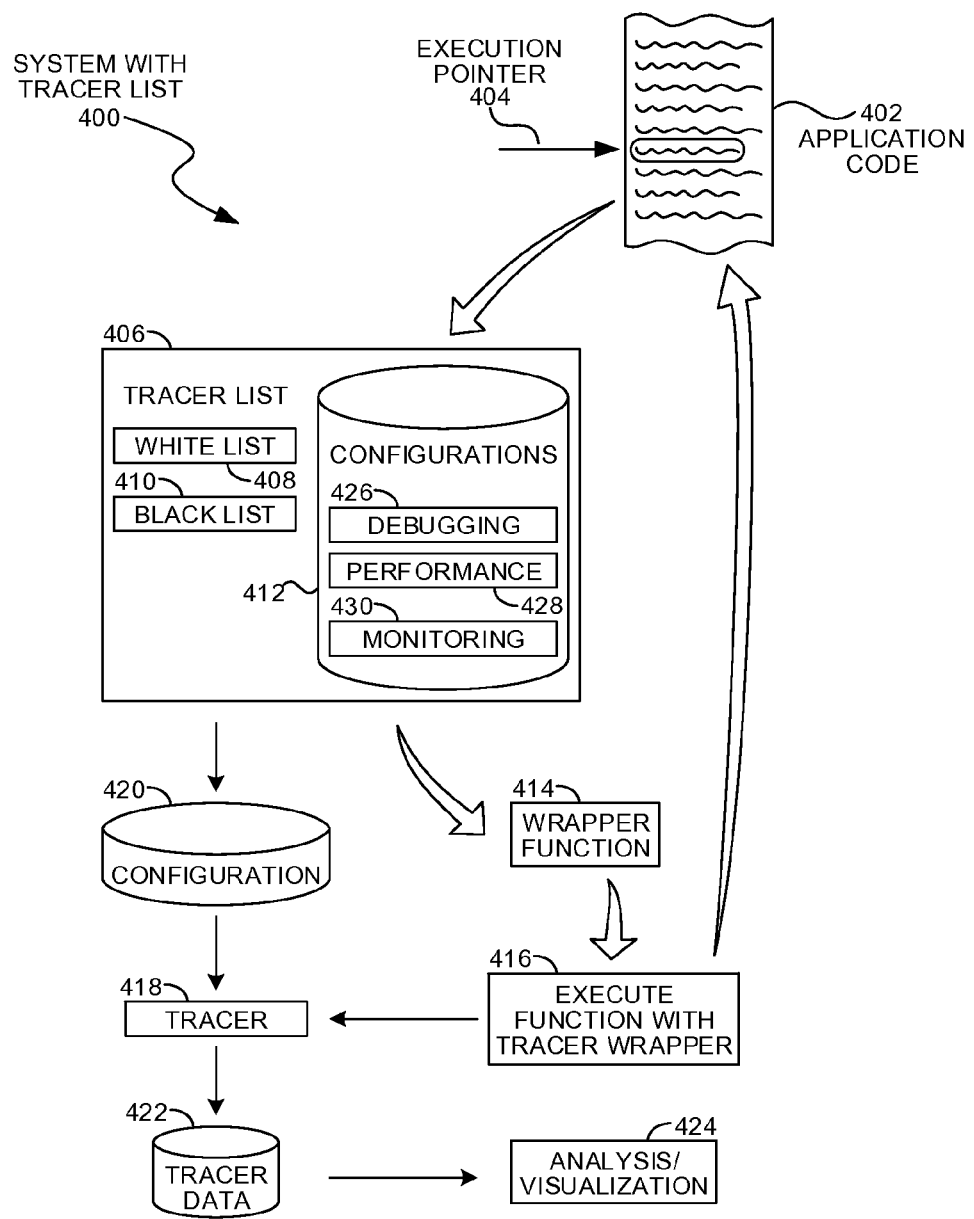
FIG. 4 is a diagram illustration of an embodiment showing a system with a tracer list.

FIG. 4 is a diagram illustration of an embodiment 400 showing a system with a tracer list. The system may use a tracer list to include or exclude functions for tracing, and may also cause different levels of tracing to be implemented. The components illustrated may be hardware components, software components operating on hardware components, or some other configuration.

Embodiment 400 is a high level view of a system in which applications may be traced with a tracer, and the tracer may be configured with a tracer list. The tracer list may define how each function may be traced, and may cause some functions to be traced while other functions not to be traced.

The tracer list may serve as a mechanism for configuring the tracer. The tracer list may be configured for different types of uses, such as debugging, performance testing, and long term monitoring.

An application may be executed by processing executable code 402. An execution pointer 404 may identify the portion of code to execute. As a function is encountered, a look up may be performed against a tracer list 406. The look up may determine if and how to trace the function.

The tracer list 406 may be any type of database in which may be stored descriptors of functions to trace, and in some cases the type of tracing to perform. In many cases, the database may be implemented as a list, with an expression identifying a function. Other data structures may be used in other embodiments.

For the purposes of this specification and claims, the term "tracer list" may include any type of database in which function descriptions may be stored. The term "tracer list" is intended to include list data structures as well as any other type of data structure to express the concepts described as stored in the tracer list.

The tracer list 406 may include whitelist 408 and blacklist 410 entries. The whitelist 408 and blacklist 410 may describe functions to include and exclude, respectively, for tracing. Different embodiments may implement the whitelist and blacklist concepts differently. Some embodiments may use only whitelists, while other embodiments may use only blacklists, and still other embodiments may deploy both whitelists and blacklists.

When deployed alone, a whitelist or blacklist may define the functions to include or exclude, respectively, when tracing. In a whitelist version of such an embodiment, every function matching a whitelist may be traced, while every function not found in the whitelist may not be traced. Similarly in a blacklist version, every function defined in the blacklist would be excluded from tracing, and all other functions would be included.

When deployed together, either a whitelist or blacklist may be treated as having priority over the other list or overriding the other list. For example, a whitelist may be deployed as listing all functions to trace, but a blacklist may override the whitelist to remove a function that may be otherwise permitted to be traced. In the converse example, a blacklist may identify those functions to remove from tracing, but a function identified in a whitelist may add those functions back to the set of tracable functions.

The tracer list 406 may include any type of definition or expression that may identify a function. Many embodiments may define functions as members in a group. The group may be a file, module, library, service, or other group definition.

For the purposes of this specification and claims, the concept of identifying a function may be performed through any mechanism by which a function may be identified. In some cases, a function may be identified by specifically identifying the function name. In some cases, a function may be identified by identifying a group to which the function may be a member. For example, a function may be identified by a module, library, service, or file from which the function originated.

In some cases, a function may be identified through an expression that may be evaluated at runtime or whenever the function may be identified. The expression may include various external data sources, comparing different memory objects, or other components of an expression. In a simple example, an expression may identify a function having a module name and being traced during a specific time period and when a resource, such as free memory, is below a specified level. In such an example, various external data factors, such as time, performance factors, or other conditions may be satisfied prior to including or excluding the function for tracing.

The tracer list 406 may include various configurations 412. The configurations 412 may define how a function may be traced, and may be considered a tracing 'level'. In some cases, the various configurations may be arranged in a high to low level, while in other cases, the configurations may not lend themselves to a linear or sequential arrangement.

In the example of embodiment 400, the configurations 412 may include debugging level 426, performance level 428, and monitoring level 430 configurations. A debugging level tracing may be used to collect detailed information that may be used to help a developer understand an application at a low level. In some cases, a debugging level trace may include details that may help the developer determine if an application is performing at its most basic level. In many cases, a debugging level tracing operation may consume many times the resources of the underlying application, causing the application's performance to be adversely affected.

A performance level tracing may collect data that may be used to identify and correct performance problems in an application. A performance level tracing may use fewer resources than debugging level tracing, so that the tracing results may better reflect the application's performance characteristics. A performance level tracing may differ from a debugging level tracing in the data collected and how the data are summarized. A debugging level tracing may collect memory object values and parameters passed to a function, while a performance level tracing may not collect such values and may, instead, collect data representative of performance type metrics.

A monitoring level tracing may be a configuration that may be used to monitor the long term operation of an application. A monitoring level tracing may use different monitored data and provide different summaries of such data than other tracing levels. In a typical use, a monitoring level tracing may be used by an administrator to determine the health of an application in production, as opposed to the use of a debugging level or performance level tracing, which may be used by a developer prior to launching an application in production.

The examples of the various configurations 412 are not meant to be inclusive but may represent various uses of a tracer file and configurations that may be applied to a tracer file.

A function may be traced by using a wrapper function 414, which may be executed with the traced function 416. The wrapper may provide hooks or other connections such that a tracer 418 may collect tracer data 422. The tracer data 422 may be used by various analyses and visualizations 424.

The tracer 418 may operate with a configuration 420, which may define how the tracer 418 may collect and summarize data. The configuration 420 may include the data elements to collect, and in some cases, how the data may be processed for downstream use. The data elements may include any raw data that may be measured or collected while observing or monitoring a function. The subsequent processing may include summarizing, analyzing, generating statistics, formatting, storing, or any other operation that may be performed on the data.

Figure 5:
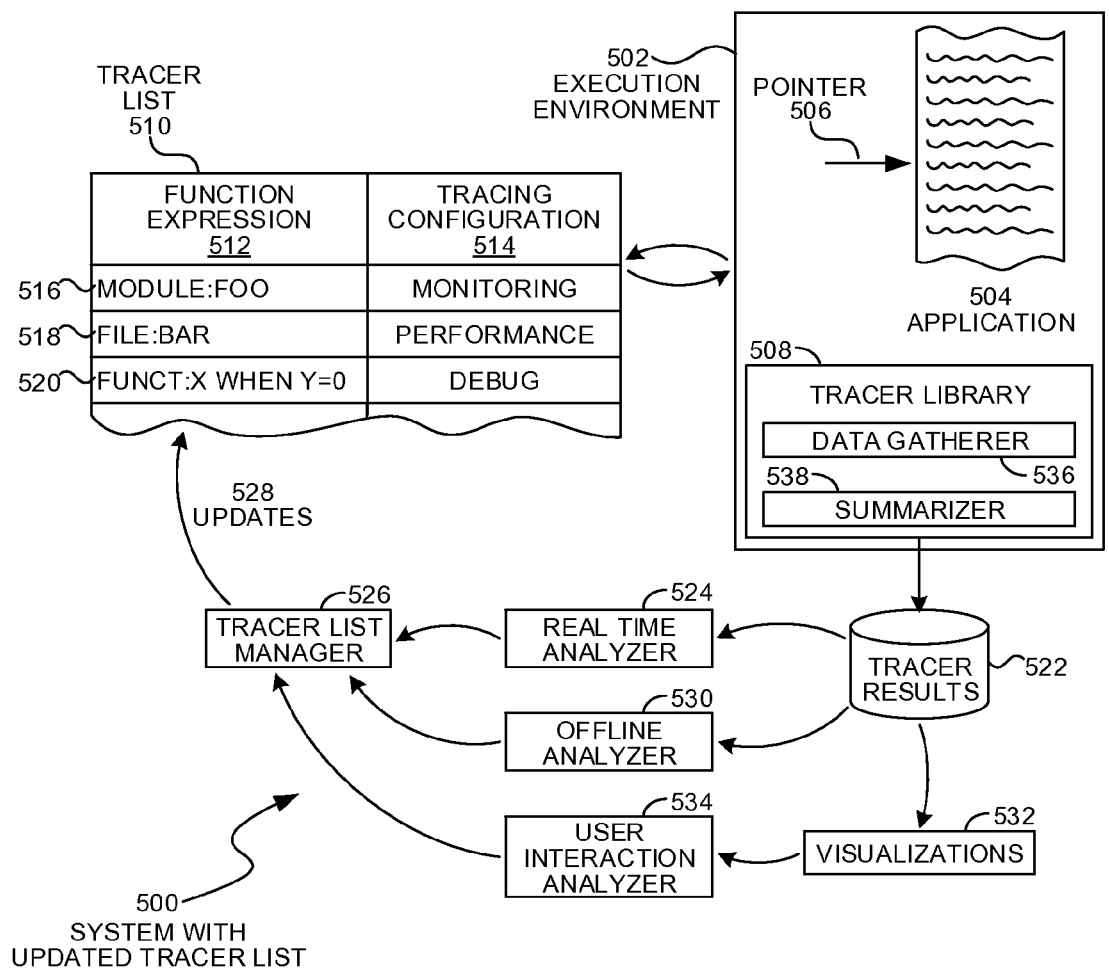
FIG. 5 is a diagram illustration of an embodiment showing a system with a tracer list that may be updated.

FIG. 5 is a diagram illustration of an embodiment 500 showing a system with mechanisms to update a tracer list. Embodiment 500 illustrates the general flow and various components that may be implemented to update a tracer list. The components illustrated may be hardware components, software components operating on hardware components, or some other configuration.

Embodiment 500 illustrates a system that may feedback information into a tracer list 510 from various sources to cause a tracer to operate in different manners. The feedback loop may gather information in real time, through offline analysis, or through user interactions with the tracer results. The feedback information may increase, decrease, or otherwise change the tracer operations with respect to a single function or group of functions. In some cases, the information fed back to the tracer list 510 may cause tracing to be eliminated for certain functions.

An execution environment 502 may execute an application 504. The execution of application 504 may be represented by an execution pointer 506, which may identify the current line or function being executed.

The execution environment 502 is illustrated as executing the application 504 in an instruction by instruction manner. In some cases, the application 504 may be compiled prior to execution, using a traditional compiler or a just in time compiler. Some execution environments may use interpreted code or may execute machine code. Some execution environments may use other mechanisms for executing an application.

A tracer library 508 may be a software component that has a data gatherer 536 and summarizer 538. The gatherer 536 may be a tracer component that gathers raw data by observing the application 504. The raw data may be performance observations, resource consumption, elapsed time, input and output data values, memory object contents, or any other type of data that may be gathered at the time a function is executed.

The summarizer 538 may prepare the raw data for downstream use. In some cases, the summarizer 538 may aggregate much of the raw data. In one such example, the summarizer 538 may count how many instances were called during a period of time for a particular function. The downstream tracer results 522 may contain only the summarized data, and the raw data may be discarded.

In many embodiments, the amount of data collected by a gatherer 536 may be much more data than may be processed by the downstream components, especially when the data are continually generated while executing the application 504. In such a case, the summarizer 538 may perform an initial analysis of the data to generate statistics that may represent the underlying data. The statistics may be further analyzed, summarized, and represented by various visualizations 532 and other analysis that may be performed.

As each function may be encountered by the tracer, a query may be made to a tracer list 510 to determine whether or not to trace a function, and how to trace a function when so selected. The tracer list 510 as illustrated in embodiment 500 may represent merely one example of a data structure that may contain information sufficient to determine if and how to trace a function.

The tracer list 510 may contain entries comprising a function expression 512 and a tracing configuration 514 to apply to the selected functions. In the example of tracer list 510, the tracer list 510 may serve as a whitelist, where each function identified in the tracer list 510 may be traced only when the function may be found in the tracer list 510. In some embodiments, a default for functions not found in the tracer list 510 may be to not trace those functions.

The tracer list 510 contains several example entries that may illustrate different manners of identifying a function. In entry 516, a function may be identified by a module name. Such an entry may apply the same level of tracing to all functions represented by the group of functions identified as module:foo. In the case of entry 516, the tracing configuration 514 applied to such functions is a monitoring level configuration. In entry 518, functions belonging to file:bar may have a performance level tracing applied. Entry 520 may include an expression that may be evaluated at runtime to select functions named X but may be traced when memory object Y=0. When such a condition may be satisfied, the function X may be traced at a debug level.

The example of tracer list 510 is merely one example of how different expressions may be used to identify functions for tracing, then to apply different levels of tracing to specific functions. The example of tracer list 510 may have an implied or explicit hierarchy when applying function expressions. For example, one implementation may allow the last expression to override previous expressions. In the example, assume that function X is found in module:foo. In the entry 516, function X would be assigned tracing at a monitoring level, but in entry 520, function X's tracing would be overridden to a debug level when object Y=0.

The tracer results 522 may be analyzed in several different manners to update or change the tracer list 510.

A real time analyzer 524 may identify functions for which a tracing configuration may not be appropriate, and may relay changes to a tracer list manager 526, which may send updates 528 to the tracer list 510. The changes identified by a real time analyzer 524 may increase the tracing level of a function that may be underrepresented or may decrease the tracing level of a function that may be overrepresented.

An underrepresented function may be one in which the effects of the function may not match the data being collected for the function. A function that has large effects on one or more performance or other metrics may also have a larger amount of data collected, whereas functions with little effects on various metrics may have little data collected.

Such a situation may be relevant when a relatively small number of functions contribute to a substantial portion of a metric, while a large number of functions may contribute little or no effects to a metric. In such a situation, a reduction in the monitoring and tracing of the large number of functions with little effect may substantially reduce the tracing overhead. Such tracing overhead may then be applied to increasing detailed tracing of the functions that have larger effects.

The real time analyzer 524 may operate in a tracing system where raw data are collected and then summarized for analysis and storage. Many tracing systems may perform some initial summarization as part of the data collection operation. For example, a tracing system may gather raw data and provide data summaries at periodic intervals, such as every second or every minute. In some cases, the real time analyzer 524 may execute on the same hardware platform as the execution environment 502 and as a component of the tracer library 508.

A feedback loop of a real time analyzer 524 may update the tracer list 510 in real time or near-real time. The effects of the real time analyzer 524 may change the tracing levels and thus the collected data over the course of a tracing run, which may last merely seconds or for hours, days, or even months.

The real time analyzer 524 may perform an analysis within each update time period. In such embodiments, the real time analyzer 524 may operate as part of a tracer application and may execute on a host device that may also execute the application under test.

In many cases, a real time analyzer 524 may be a lightweight analysis that may use a threshold analysis of a particular metric to increase or decrease tracing levels for a function or group of functions. The threshold analysis may increase tracing when the function contributes more than a predefined percentage to a particular metric, then decrease tracing when the function contributes less than a second percentage.

For example, when a function contributes more than 1% to a metric relating to a resource consumption, such as processor consumption or memory consumption, the tracing level of the function may be increased. When the same function falls to below 0.5% contribution to the same metric, the tracing level may be decrease. In the example, the difference between the threshold to increase tracing and the second threshold to decrease tracing may be one mechanism for introducing hysteresis, which may avoid over-changing the tracer levels for marginal situations. In the example, thresholds of 1% and 0.5% were used solely as examples of possible threshold percentages. Other embodiments may use 0.1%, 0.2%, 2%, 5%, 10%, or other percentages.

An offline analyzer 530 may analyze the tracer results 522 to generate recommendations from which a tracer list manager 526 may create updates 528 to the tracer list 510. The offline analyzer 530 may operate on a separate hardware platform than the tracer 508. In some cases, the offline analyzer 530 may execute on the same hardware platform as the tracer 508.

In many cases, the offline analyzer 530 may operate without the presumption that the analysis results may be consumed in real time. As such, the offline analyzer 530 may be able to execute more detailed or complicated algorithms than may be expected in a real time analyzer 524.

The offline analyzer 530 may analyze tracer results 522 from multiple tracer runs. The tracer results 522 may be from the same application 504, different versions of the application 504, or from multiple applications that may share common functions. The offline analyzer 530 may examine historical data to identify which functions may be more statistically significant than others, and may establish recommendations for tracing levels that may be applied to those functions.

The results from the offline analyzer 530 may be more general than results that may be expected from a real time analyzer 524, in that the offline analyzer 530 may provide a general guidance or recommendations for setting initial tracing level. The recommendations may be used as an initial starting point for tracing, and in some cases, a real time analyzer 524 may further modify the tracing levels from the recommendations for a specific tracing run.

The offline analyzer 530 and the real time analyzer 524 may identify settings for individual functions or may identify settings for groups of functions. Some analyzers may examine all or a sample of functions in a file, module, library, service, or other group of functions, and may apply the same settings to all of the functions in the group. In some cases, common settings across multiple functions may be useful when certain visualizations or analyses may compare functions to each other, or may combine functions together to generate aggregated statistics.

In some cases, the real time analyzer 524 and offline analyzer 530 may identify particular settings on a function-by-function basis. Such settings may identify certain settings that may optimize how a tracer handles each function. In some cases, the analyzers may determine certain conditions or settings that may avoid error conditions or problems that may have occurred in previous tracer runs.

A user interaction analyzer 534 may analyze how a user interacts with visualizations 532 or other representations of the tracer results 522. The results of the analysis may identify which functions or groups of functions are of interest to a user. The user's behavior with certain functions may identify which functions are highly viewed and analyzed, and which are not. Those functions which are not viewed often or at all may have tracing disabled or performed at a very minimal amount.

Figure 6:
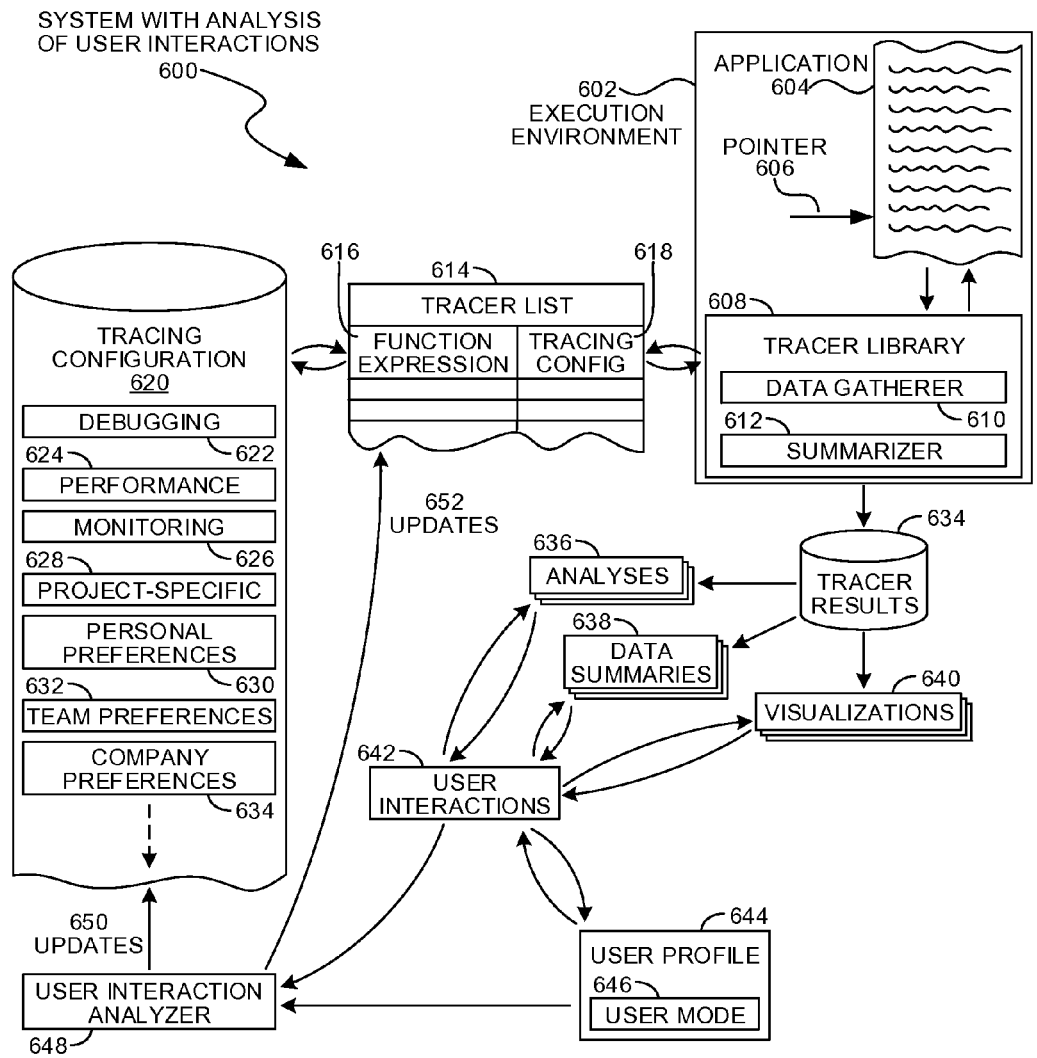
FIG. 6 is a diagram illustration of an embodiment showing a system with a user interaction analyzer.

FIG. 6 is a diagram illustration of an embodiment 600 showing a system with mechanisms to update a tracer list based on user interactions. Embodiment 600 illustrates the general flow and various components that may be implemented to update a tracer list. The components illustrated may be hardware components, software components operating on hardware components, or some other configuration.

Embodiment 600 illustrates a system that may feedback information into a tracer list 614 and a database of tracer configurations 620 based on user interactions with tracer data. The feedback loop may gather information in real time, through offline analysis, or through user interactions with the tracer results. The feedback information may increase, decrease, or otherwise change the tracer operations with respect to a single function or group of functions. In some cases, the information fed back to the tracer list 614 and tracer configurations 620 may cause tracing to be eliminated for certain functions.

An execution environment 602 may execute an application 604. The execution of application 604 may be represented by an execution pointer 606, which may identify the current line or function being executed.

The execution environment 602 is illustrated as executing the application 604 in an instruction by instruction manner. In some cases, the application 604 may be compiled prior to execution, using a traditional compiler or a just in time compiler. Some execution environments may use interpreted code or may execute machine code. Some execution environments may use other mechanisms for executing an application.

A tracer library 608 may be a software component that has a data gatherer 610 and summarizer 612. The gatherer 610 may be a tracer component that gathers raw data by observing the application 604. The raw data may be performance observations, resource consumption, elapsed time, input and output data values, memory object contents, or any other type of data that may be gathered at the time a function is executed.

The summarizer 612 may prepare the raw data for downstream use. In some cases, the summarizer 612 may aggregate much of the raw data. In one such example, the summarizer 612 may count how many instances were called during a period of time for a particular function. The downstream tracer results 634 may contain only the summarized data, and the raw data may be discarded.

In many embodiments, the amount of data collected by a gatherer 610 may be much more data than may be processed by the downstream components, especially when the data are continually generated while executing the application 604. In such a case, the summarizer 612 may perform an initial analysis of the data to generate statistics that may represent the underlying data. The statistics may undergo further analyses 636, data summaries 638, and represented by various visualizations 640 as well as other analysis.

As each function may be encountered by the tracer, a query may be made to a tracer list 614 to determine whether or not to trace a function, and how to trace a function when so selected. The tracer list 614 as illustrated in embodiment 600 may represent merely one example of a data structure that may contain information sufficient to determine if and how to trace a function.

The tracer list 614 may contain entries comprising a function expression 616 and a tracing configuration 618 to apply to the selected functions. The tracing configuration 618 may relate to a database of tracing configurations 620. Each of the tracing configurations 620 may be a predefined set of settings that may cause the tracer to gather certain data and summarize the data in a particular manner.

The configurations may define categories of data to collect or not to collect. Some embodiments may apply multiple configurations to a given situation, such that each configuration may add or remove elements to a tracer behavior. In one such embodiment, a base configuration may provide default settings, and each subsequently applied configuration may change the tracer behavior in more specific and detailed ways to create a customized configuration to suit a particular use case. Other embodiments may have different ways to combine multiple configurations to define a desired tracer behavior.

Some configurations may collect data items that help track process flow through an application. For example, a tracer may capture data objects passed to and from a function. Such a tracer configuration may collect enough data to follow a memory object or process flow through several functions, one after the other. Such a tracer configuration may not gather some of the resource consumption data points mentioned above. The debugging configuration 622 may be an example of such a configuration.

Some configurations may include details about performance, such as resource usage and other metrics from which efficiency or other performance metrics may be derived. Such configurations may include details about memory, processor, network, and other resource consumption. In an example of memory consumption, the amount of memory allocated to a function may be captured, along with the garbage collection performed, cache misses, and similar metrics. The performance configuration 624 may be an example of such a configuration.

Other configurations may collect data that may be useful as a monitoring configuration 626. A monitoring configuration 626 may collect data items that may reflect the general performance of an application, as may be used by an administrator to manage a production application. Such a configuration may collect a different set of data objects and measure different performance related objects than other configurations.

Some configurations may be designed or customized for specific use cases. For example, a project-specific configuration 628 may be defined for a certain use case. Such a configuration may collect additional items or perform analyses that may be tailored to a given project, and may not collect other data or perform other analyses that may not apply to the project.

A personal preferences configuration 630 may contain a set of data objects and analyses that may apply to a specific user. Team preferences configuration 632 and company preferences configuration 634 may similarly define preferences that may be defined on a user group or company-wide level.

The tracer results 634 may be used to generate various analyses 636, data summaries 638, and visualizations 640. A user interaction analyzer 648 may analyze the user interactions 642 along with a user profile 644 to generate updates 650 that may be applied to configurations 620 and updates 652 to the tracer list 614.

The user interaction 642 may be any interaction that may be captured. Some embodiments may be able to track high level interactions, such as which visualizations were viewed or which analyses performed. Other embodiments may be able to identify which data objects were viewed or manipulated within an analysis, summary, or visualization.

The more detailed the user interactions 642 may be, the more specific updates may be created by the user interaction analyzer 648. When the user interactions 642 can identify specific functions of interest to the user, the user interaction analyzer 648 may make changes to either the configurations 620 or tracer list 614.

Updates 650 made to the configurations 620 may include definitions for what data to collect and how to process the data. The updates 652 to the tracer list 614 may identify the functions, modules, libraries, or other groups of functions to which a configuration may be applied.

In general, the configurations 620 may define various use scenarios for the tracer. The use scenario may be identified in part by a user mode 646, which may be an express or implied set of tasks that a user may be performing. In many cases, a user may transition from one set of tasks to another and back. For example, a developer may begin using a tracer in a debugging mode when writing an application, then transition to performance tuning, and to monitoring mode once the application enters production. The developer may switch back and forth between the various modes as bugs may be uncovered and fixed, or when new features may be added and tested.

The user mode 646 may be implied by examining the types of analyses 636, data summaries 638, and visualizations 640 that the user happens to activate. In many cases, certain visualizations, analyses, and summaries may be targeted to a user mode, and in such cases, the user mode 646 may be inferred from the user actions.

The user mode 646 may be expressly defined by the user in some cases. Some embodiments may have a user learning mode, where the user interaction analyzer 648 may be turned on to track a user's actions and create a configuration 620 and sometimes a tracer list 614 that may map to a user's use of the tracer results 634. In such embodiments, the user may expressly define a user mode 646, then interact with the tracer results 634 through the analyses 636, data summaries 638, and visualizations 640. The user interactions 642 may be gathered during the learning period, and a user interaction analyzer 648 may create a set of configurations and tracer list entries that may be best match the user's interactions.

Embodiment 600 illustrates an embodiment where a tracer's actions may be determined by a tracer list that may be refer to a set of configurations. Other embodiments may use other data structures to store and retrieve settings that may be applied by a tracer.

Figure 7:
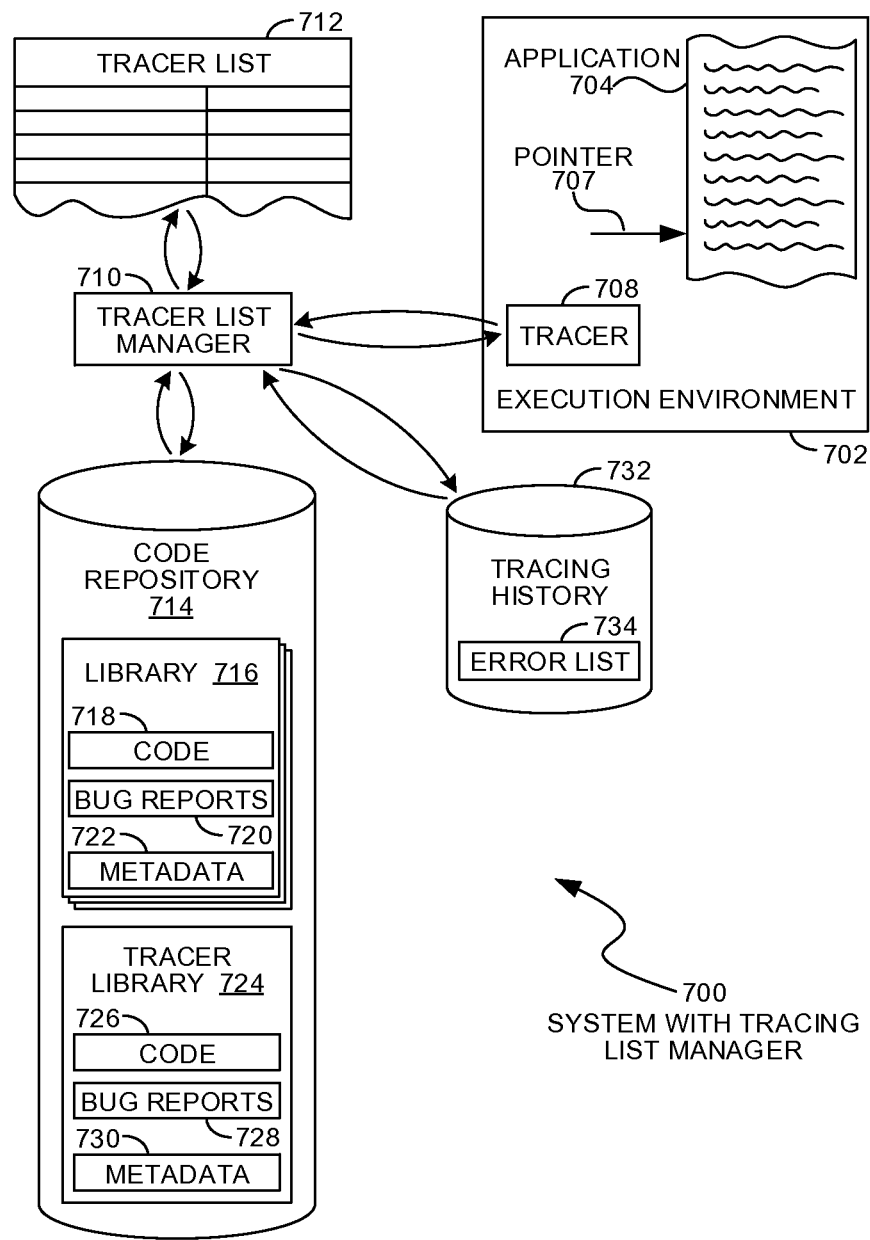
FIG. 7 is a diagram illustration of an embodiment showing a system with a tracing list manager.

FIG. 7 is a diagram illustration of an embodiment 700 showing a system with mechanisms to update a tracer list based on error logs. Embodiment 700 illustrates the general flow and various components that may be implemented to update a tracer list. The components illustrated may be hardware components, software components operating on hardware components, or some other configuration.

Embodiment 700 illustrates a system that may feedback information into a tracer list 712 based on errors, bug reports, or other documented failures. The feedback loop may gather information in real time or through offline analysis, depending on the embodiment. The feedback information may increase, decrease, or otherwise change the tracer operations with respect to a single function or group of functions. In some cases, the information fed back to the tracer list 712 may cause tracing to be eliminated for certain functions.

An execution environment 702 may execute an application 704. The execution of application 704 may be represented by an execution pointer 706, which may identify the current line or function being executed.

The execution environment 702 is illustrated as executing the application 704 in an instruction by instruction manner. In some cases, the application 704 may be compiled prior to execution, using a traditional compiler or a just in time compiler. Some execution environments may use interpreted code or may execute machine code. Some execution environments may use other mechanisms for executing an application.

As a function may be encountered in the application 704, a tracer 708 may interact with a tracer list manager 710 to determine how to trace the function. The tracer list manager 710 may query a tracer list 712 or other data structure which may store the tracer operations to be performed for an individual function or groups of functions.

The tracer list manager 710 may update the tracer list 712 may examining a code repository 714. The code repository 714 may include various libraries 716 which may be include source or compiled code 718, bug reports 720, and various metadata. A tracer list manager 710 may examine the bug reports 720 or other metadata 722 to identify known problems with tracing specific functions or groups of functions. The tracer list manager 710 may update the tracer list 712 so that subsequent tracer runs may avoid the known problems.

The bug reports 720 may be any definition of a known or suspected problem related to the code in the library 716. The bug reports 720 may be automatically generated reports that may be captured by the tracer 708 or some other component. In some cases, the automatically generated reports may include links or other notations such that a tracer list manager 710 may be able to identify a bug report, then digest the bug report to identify conditions under which tracing may be changed.

The bug reports 720 may be manually entered or edited in some cases. Such bug reports 720 may have a mechanism to identify the tracer 708 such that the tracer list manager 710 may find the bug reports relating to the tracer 708. From the bug reports, the tracer list manager 710 may be capable of determining conditions under which tracing may be changed, then update the tracer list 712 accordingly.

The code repository 714 may include a tracer library 724, which may contain various code 726, bug reports 728, and metadata 730 related to the tracer 708. In such a case, errors may be captured and stored in the The tracer list manager 710 may update the tracer list 712 by examining tracing history 732. Error lists 734 in the tracing history 732 may define circumstances under which problems may have been encountered. By analyzing the error lists 734, the conditions under which an error may have occurred may be avoided in future tracer runs by removing or changing tracer operations. Such changes may be stored in the tracer list 712 for later tracer runs.

Figure 8:
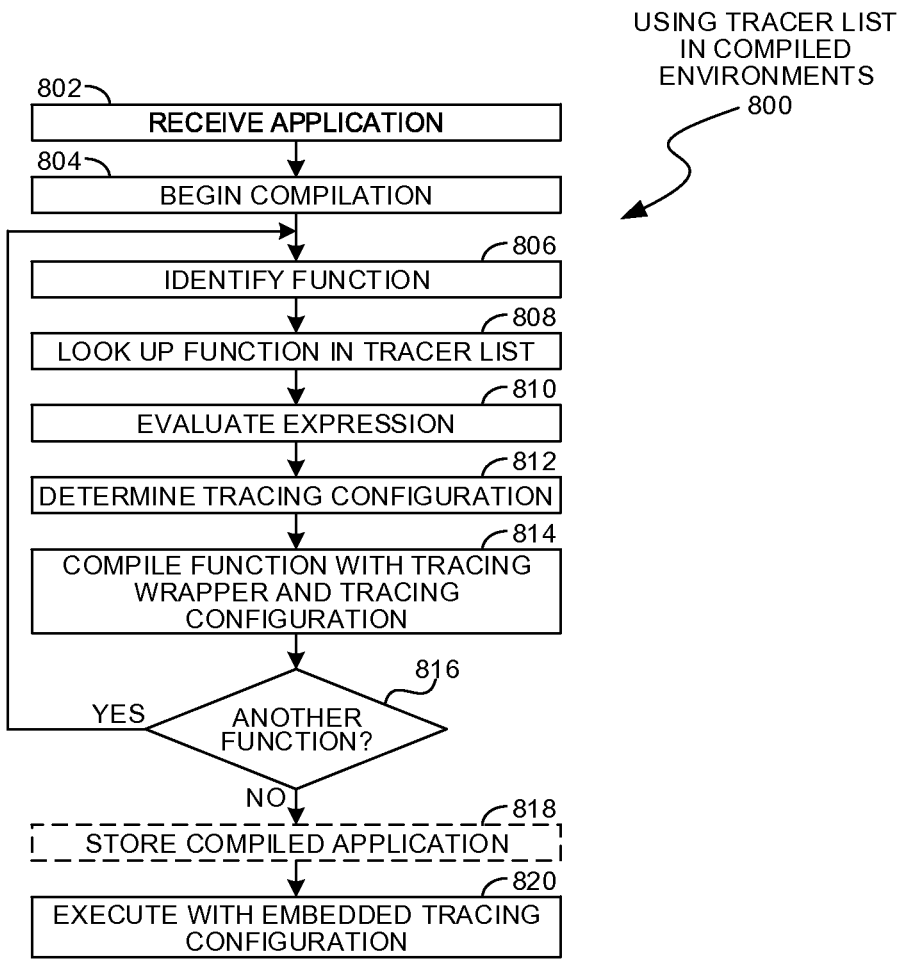
FIG. 8 is a flowchart illustration of an embodiment showing a method for using a tracer list in a compiled computing environment.

FIG. 8 is a flowchart illustration of an embodiment 800 showing a method for using a tracer in a compiled execution environment. Embodiment 800 shows a method whereby tracing operations may be added to executable code during compilation.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 illustrates a method whereby functions may be identified during compilation, then instrumentation may be added by wrapping the function with a tracer. The compiled code may then be executed. Embodiment 800 may embed tracing executable code into an application. The tracing executable code may gather various data items and, in some cases, process and store the items for later analysis.

The compilation of embodiment 800 may be compiling from source code to intermediate code, from intermediate code to executable code, from source code to executable code, or any form of compilation. In some embodiments, the compilation may be just in time compilation that may be performed at runtime.

An application may be received in block 802 and compilation may begin in block 804.

A function may be identified in block 806. The function may be any block of code for which tracing may be applied. In some cases, the function in block 806 may be a discrete function call. In other cases, the function may be an arbitrary block of code which may be traced. The function may have a name or other identifier in the source code which may be found in a tracer list.

A lookup may be performed in block 808 to identify the function in a tracer list. When the tracer list contains an expression to evaluate, the expression may be evaluated in block 810. After querying the tracer list, a tracing configuration may be determined in block 812.

The function may be compiled in block 814 with a tracing wrapper. The tracing wrapper may be any type of tracing code that may be added to the function to gather tracer information. In some embodiments, the tracing wrapper may include settings, data definitions, or other information that may cause the tracer to collect specific data items. Some embodiments may also include settings or other information that may be correlate, summarize, or otherwise prepare the raw tracer data for downstream use.

If another function may be processed in block 816, the method may return to block 806. When all the functions have been processed in block 816, the compiled application may be stored in block 818 and executed in block 820.

Figure 9:
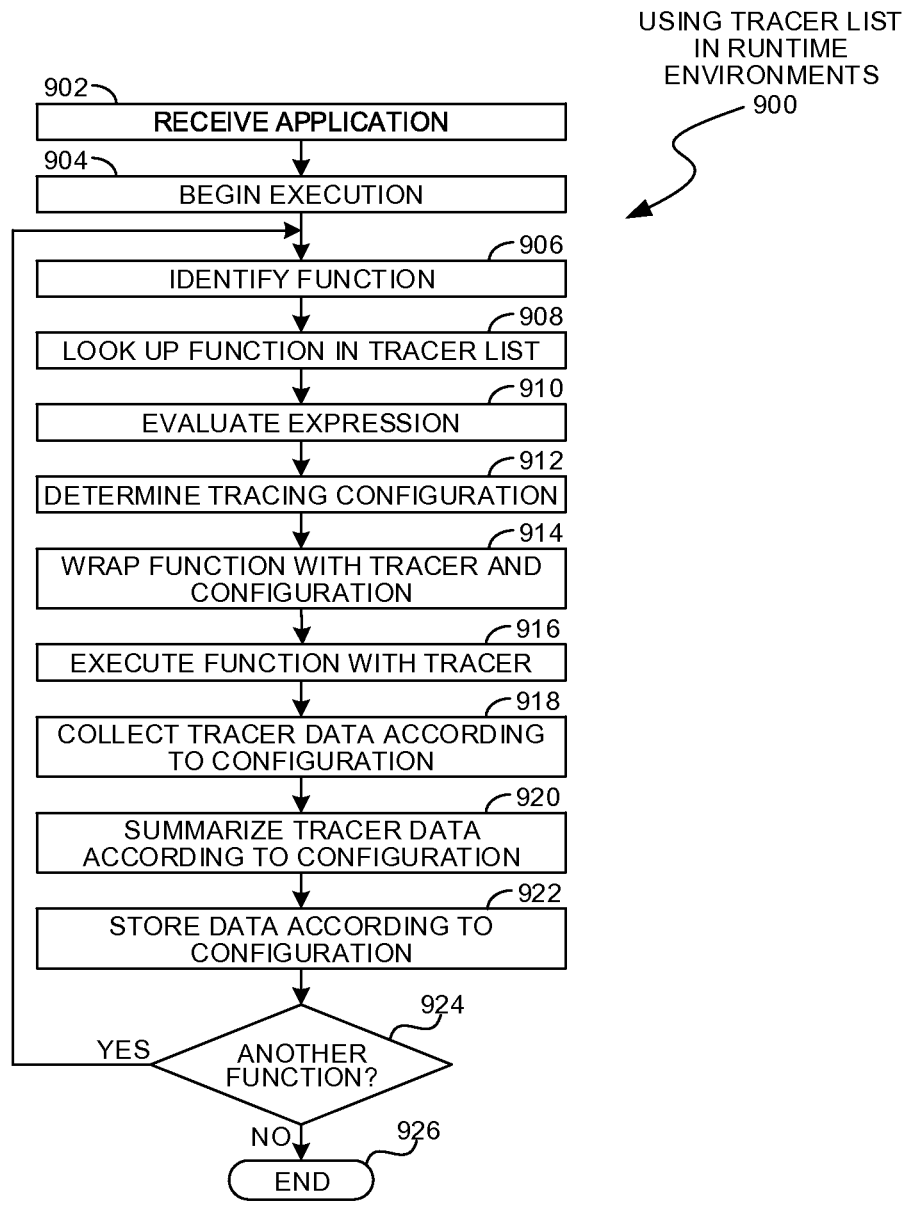
FIG. 9 is a flowchart illustration of an embodiment showing a method for using a tracer list in an interpreted computing environment.

FIG. 9 is a flowchart illustration of an embodiment 900 showing a method for using a tracer in an interpreted execution environment. Embodiment 900 shows a method whereby tracing operations may be added to executable code while interpreting the executable code.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 illustrates a method whereby functions may be identified during interpreting the executable code, then instrumentation may be added by wrapping the function with a tracer. Embodiment 900 may add tracing executable code into an application as an application executes. The tracing executable code may gather various data items and, in some cases, process and store the items for later analysis.

An application may be received in block 902 and execution may begin in block 904.

During execution, a function may be identified in block 906. The function may be looked up in a tracer list in block 908. In many cases, the tracer list may include expressions that may be evaluated to determine whether to trace a function, or the configuration of the tracing to perform on a function. In such cases, the function may be evaluated in block 910 and the tracing configuration may be determined in block 912.

The function may be wrapped with a tracer in block 914. In some cases, the tracer may be configured in block 914 to perform specific data collection and summarization operations.

The function may be executed in block 916 with the tracer. As the function executes, the tracer may gather data in block 918 and summarize the data in block 920. The data may be stored in block 922.

If another function may be processed in block 924, the method may return to block 906. When all the functions have been processed in block 924, the application may end in block 926.

Figure 10:
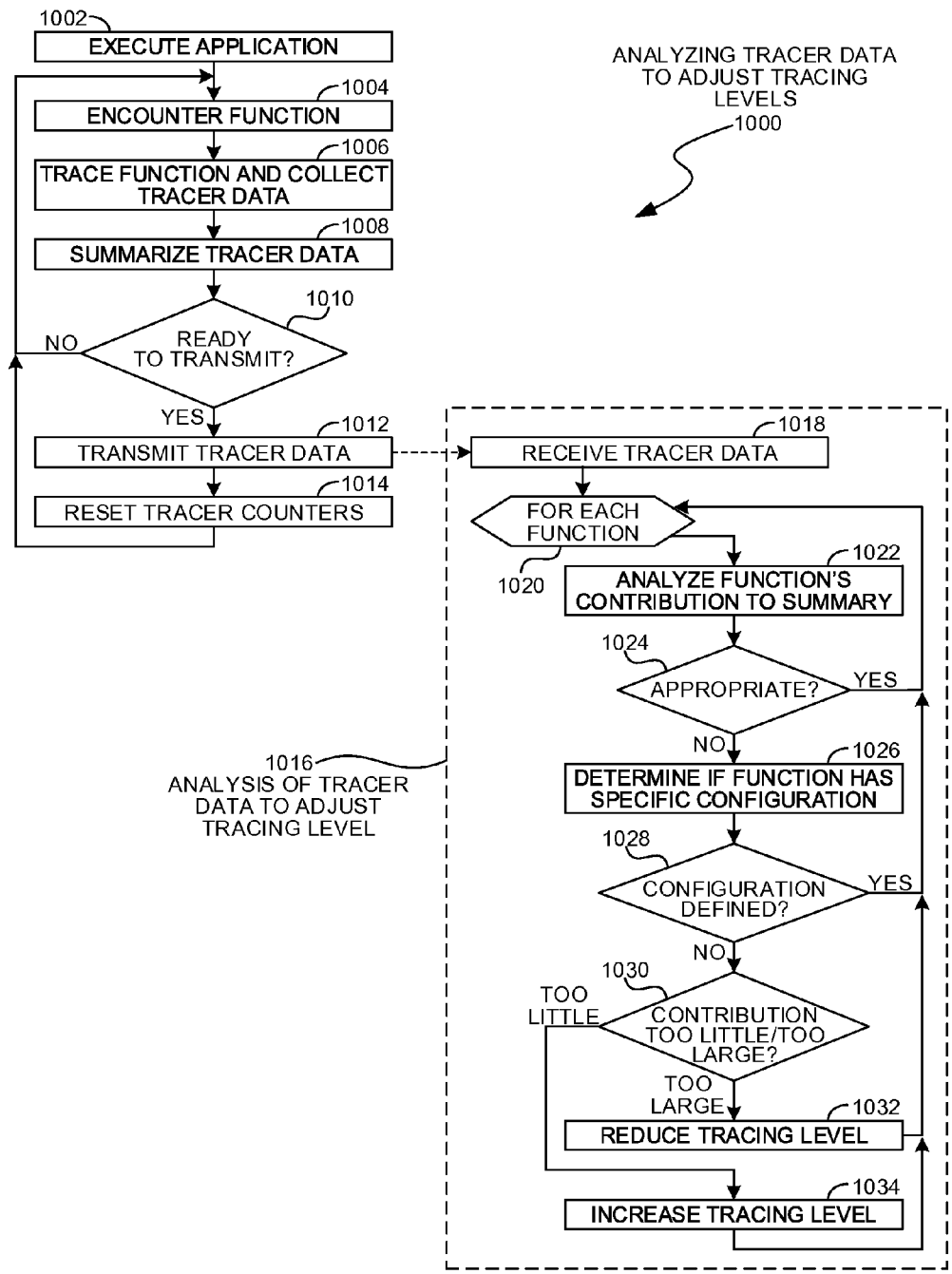
FIG. 10 is a flowchart illustration of an embodiment showing a method for analyzing tracer data to adjust tracing levels.

FIG. 10 is a flowchart illustration of an embodiment 1000 showing a method for analyzing tracer data to adjust tracing levels. Embodiment 1000 illustrates one method by which tracing may be updated in real time, near-real time, or by post processing tracer data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 illustrates a method whereby a tracer may operate in an execution environment and generate tracer data. The data may be analyzed to identify those functions for which tracing may be increased or decreased.

An application may begin execution in block 1002. A function may be encountered in block 1004, and the function may be traced in block 1006 to generate raw tracer data. The tracer data may be summarized in block 1008.

Until the tracer data is ready for transmission in block 1010, the process may loop back to block 1004. When the tracer data is ready for transmission in block 1010, the transmission may occur in block 1012. The tracer counters may be reset in block 1014 and the process may return to block 1004 to perform another loop.

The operations of blocks 1002 through 1014 may represent a typical execution of an application with a tracer where the tracer may transmit data on occasion. Some tracers may transmit data on a periodic time basis, such as every second, minute, hour, or some fraction thereof. Other tracers may transmit data on an event, which may be an external event received by the application or any other event.

Analysis of the tracer data to adjust the tracing levels may occur in block 1016. In some embodiments, the operations of block 1016, may be performed during the period of time when the tracer may be looping at block 1010 prior to transmitting the next set of tracer results. In such embodiments, the operations of block 1016 may be performed in 'real time' or near-real time. Such embodiments may adjust or tune the tracer based on the data that are being observed at any given time.

The tracer data may be received in block 1018. Each function identified in the tracer data may be analyzed in block 1020.

For each function in block 1020, the function's contribution to the summary statistics may be analyzed in block 1022. When the function's contribution is appropriate in block 1024, the process may return to block 1020.

An appropriate contribution in the analysis of block 1022 may weigh whether or not the level of tracing matches the function's contribution to the statistics. When the function contributes little to the statistics, an appropriate level of tracing may be minimal tracing. When the function contributes a large amount to one or more statistics, an appropriate level of tracing may be higher.

The appropriate level of tracing for a given situation may depend on the design of the tracing system and the analyses performed on the raw data. Many such systems may use predefined thresholds for determining appropriateness. For example, a function that may contribute less than 1% to summarized statistics may be traced at a minimal level, while functions that contribute more may be traced at a higher level. The higher level tracing may gather additional data points, measurements, or other observations that may affect various statistics.

In some cases, a function may have a specific configuration that may override any adjustment. Such a configuration may be identified in block 1026. When a specific configuration has been defined for the function in block 1028, the function may be left unchanged and the process may return to block 1020.

When the function does not have a specifically defined configuration in block 1028 and the function's contribution is inappropriate in block 1024, the tracing for the function may be adjusted.

When the function's contribution is too large relative to the function's tracing level in block 1030, the tracing level may be reduced in block 1032. When the function's contribution is too small relative to the function's tracing level in block 1030, the tracing level may be increased in block 1034.

The changes to the tracing level may be made by updating a tracer list or other mechanism that may be define how a function may be traced. In a real time or near-real time implementation of embodiment 1000, the tracer may limit the amount of tracing performed on functions with little impact on the tracing statistics, while making sure that the functions which make an impact are adequately traced.

Figure 11:
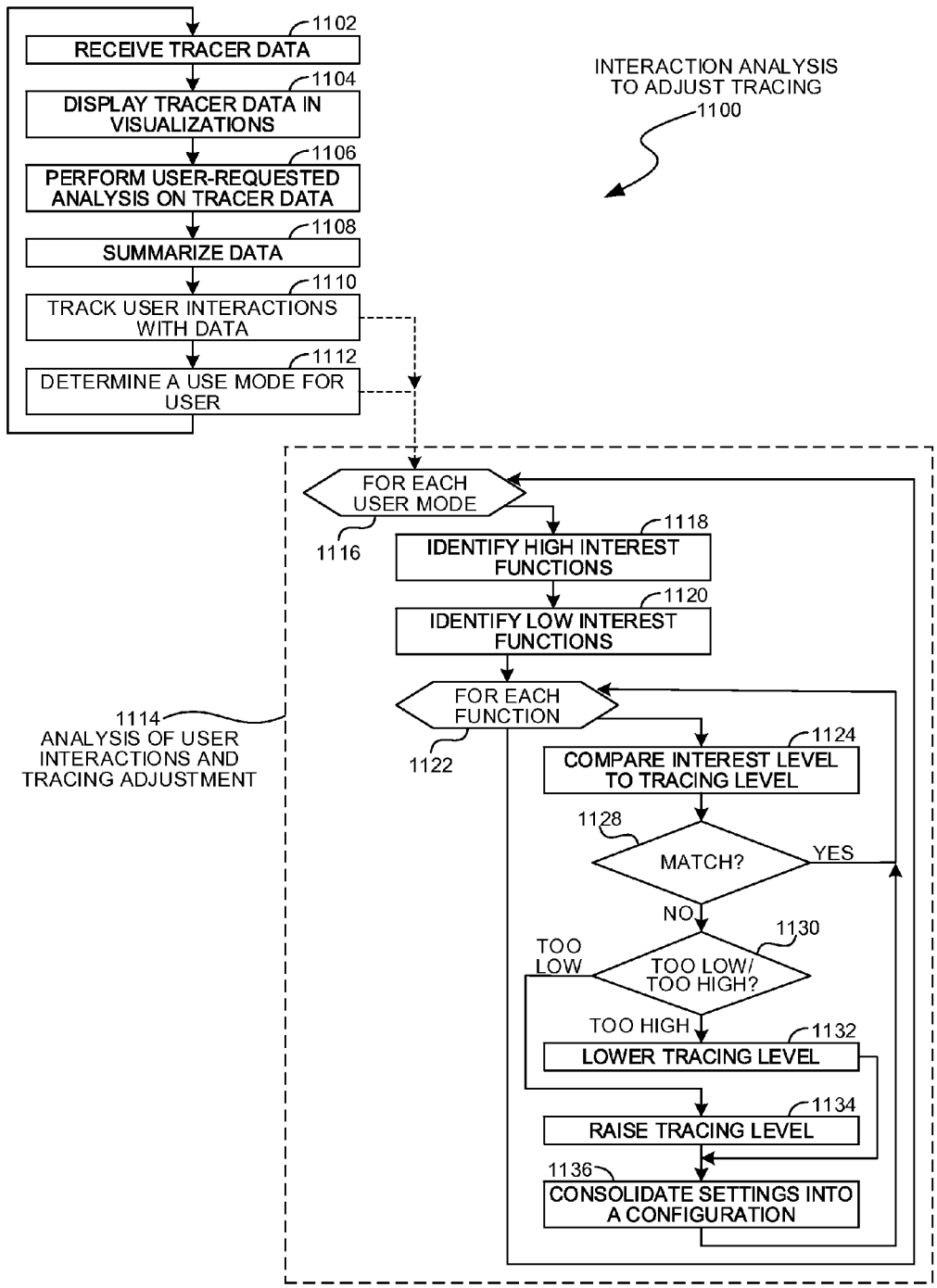
FIG. 11 is a flowchart illustration of an embodiment showing a method for analyzing user interactions to adjust tracing configurations.

FIG. 11 is a flowchart illustration of an embodiment 1100 showing a method for user interaction data to adjust tracing levels. Embodiment 1100 illustrates one method by which tracing may be updated based on user interaction with tracer data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1100 illustrates one method by which user interactions with tracer results may be used to identify functions that may be more or less important than other functions. Functions may be categorized by the interest level shown by a user in data related to the function. Those functions for which the user showed a large amount of interest may be traced at a high level, while those functions for which the user showed little interest may be traced at a relatively lower level.

Tracer data may be received in block 1102. The data may be viewed using various visualizations in block 1104 and analyzed in block 1106 with various user-selected analyses. The data may be summarized in block 1108.

The user interactions with the various data representations may be tracked in block 1110.

A use mode for the user may be determined in block 1112. The use mode may refer to a set of tasks or goals that may be achieved while interacting with tracer data. Examples of use modes may include debugging mode, performance testing mode, monitoring mode, and others. The modes may be used to gather a set of tracer settings into a generalized configuration that may apply to different manners in which a tracer may be used.

Analysis of user interactions may happen in block 1114, which may result in changes to tracing levels, and the changes may be consolidated into configuration definitions.

Each use mode may be analyzed in block 1116. Within each use mode, different tracer settings may define the data collected by a tracer, as well as the summarization, analyses, and other operations that may be performed on tracer results.

For each user mode in block 1116, high interest functions may be identified in block 1118, and low interest functions may be identified in block 1120. The high interest functions may be those functions that underlie the analyses, visualizations, and other interactions that a user may have with tracer data. The low interest functions may be those functions whose tracer data may not have been viewed by users.

The interest level of a function may be determined from the user's actions performed with the data. Each embodiment may have different mechanisms for classifying a function's interest level. One mechanism may identify each user interaction where data were viewed, and classify the underlying functions as high interest. Those functions for which their data were rarely or never viewed may be classified as low interest.

Another mechanism for classifying user interest level in a function may be to assign weights to different user interactions. When a user collapses or minimizes a portion of a visualization, those functions whose data were minimized may be classified as low interest. Similarly, analyses that may not have been viewed or were viewed for short periods of time may have the associated functions identified as low interest. Conversely, those functions whose data may be viewed or explored in detail may be classified as high interest.

Some interactions may be weighted as providing a higher interest level than other interactions. For example, a visualization where a user may expand and explore details relating to certain functions may weight detailed browsing with a higher weight than browsing the same visualization without the detailed exploration of certain areas of the visualization.

The user interactions may be aggregated across multiple users for the same tracer data set. In such embodiments, the result of the analyses in block 1114 may be a configuration that represents many user's input.

The user interactions may be aggregated across tracer results of multiple instances of the same application. In some cases, the user interactions may reflect aggregated results over user interactions with tracer results from multiple applications.

For each function in block 1122, the interest level may be compared to the previous tracing level. If the interest level matches the tracing level in block 1128, the tracing level may be left unchanged. When the interest level does not match the tracing level in block 1128, and the tracing level is too high in block 1130, the tracing level may be lowered in block 1132. When the interest level does not match the tracing level in block 1129, and the tracing level is too low in block 1130, the tracing level may be raised in block 1134.

The adjusted tracing levels may be consolidated into a configuration definition in block 1136. The configuration setting may reflect baseline settings that may apply to a specific use mode.

Figure 12:
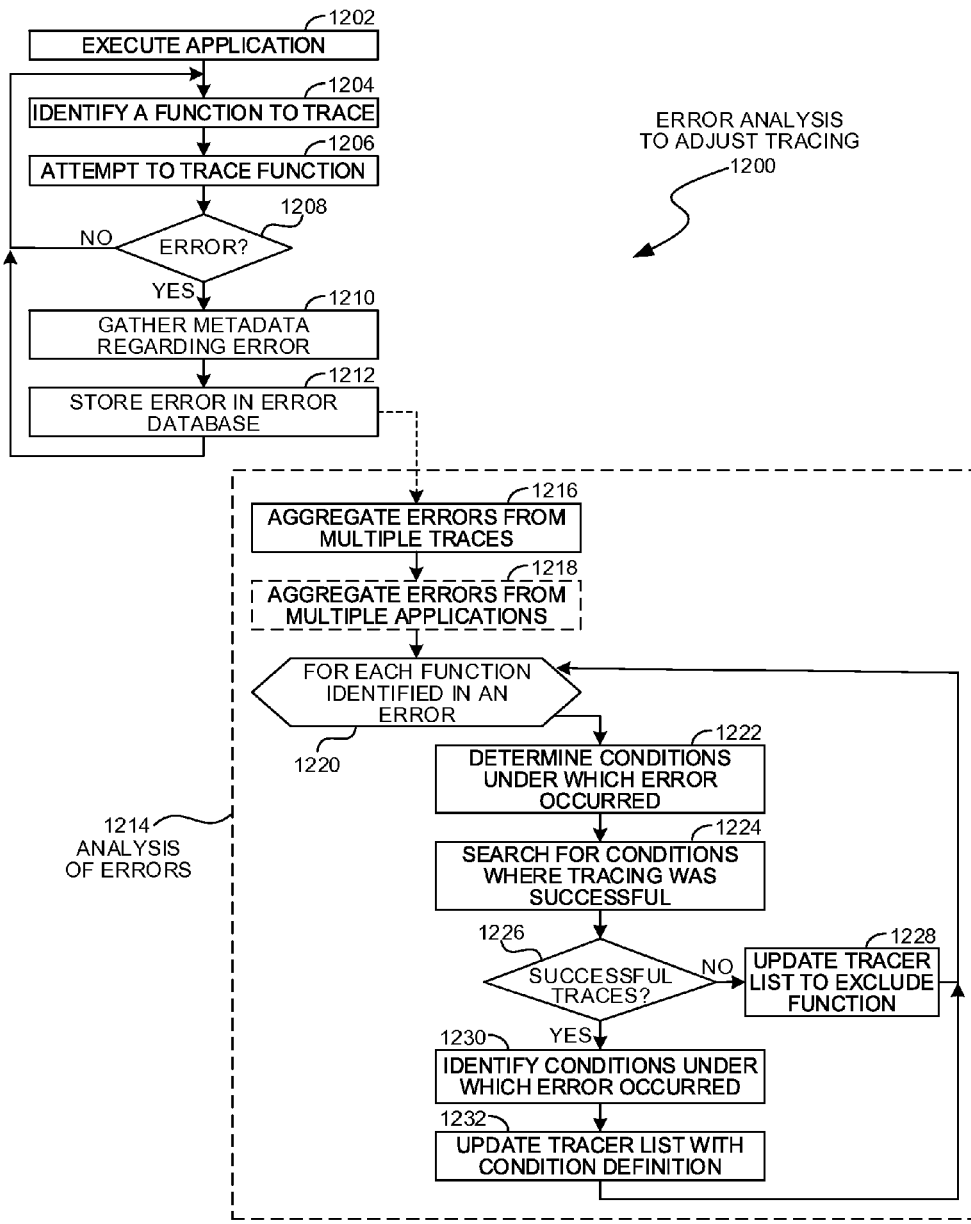
FIG. 12 is a flowchart illustration of an embodiment showing a method for error analysis to adjust tracing configurations.

FIG. 12 is a flowchart illustration of an embodiment 1200 showing a method for adjusting tracing based on errors identified during prior uses of the tracer. Embodiment 1200 illustrates one method by which tracing may be updated based on bugs, error logs, or other sources of historical incidents.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1200 is one example embodiment showing a method for changing tracing operations based on historical bug reports or errors.

An application may begin execution in block 1202. A function may be identified in block 1204 and an attempt at tracing may be performed in block 1206. If no errors occurred in block 1208, the process may loop back to block 1204.

When an error occurs in block 1208, metadata regarding the error may be gathered in block 1210 and the error may be stored in a database in block 1212. The metadata may include any information that may relate to the error and may identify potential factors that may have caused or may affect the error.

The errors may be analyzed in block 1214. The errors from multiple traces may be aggregated in block 1216. In some embodiments, errors from multiple applications may be aggregated in block 1218.

For each function identified or derived from an error in block 1220, the conditions under which the error occurred may be analyzed in block 1222. A search may be made in block 1224 for successful traces of the function under different circumstances.

If no successful traces exist in block 1226, the tracer list may be updated in block 1228 to exclude the function from tracing. In such a case, the function may be completely excluded or may have a very minimum level of tracing applied.

When at least one successful trace was performed in block 1226, the conditions under which the error occurred may be identified in block 1230 and a conditional expression may be created for the tracer list in block 1232, which may prohibit or limit the tracing under the conditions.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:
    receiving a set of user interactions, said set of user interactions being gathered during a user session with a visualization, said visualization representing tracer data gathered by tracing an application with a tracer, said application comprising a plurality of functions;
    analyzing said set of user interactions to identify a first function as a low interest function; and
    causing said tracer to trace said first function at a reduced tracing level.

2. The method of claim 1 further comprising:
    analyzing said set of user interactions to identify a second function as a high interest function; and
    causing said tracer to trace said first function at an enhance tracing level.

3. The method of claim 2, said plurality of tracer results comprising tracer results from a plurality of different applications.

4. The method of claim 3, said plurality of tracer results comprising tracer results from said first application.

5. The method of claim 3, said plurality of tracer results not comprising tracer results from said first application.

6. The method of claim 2, said user interactions comprising minimizing said first function.

7. The method of claim 6, said user interactions comprising inspecting data relating to said second function within said visualization.

8. The method of claim 2 further comprising:
    storing an entry for said first function in a tracer database, said tracer database being queried during tracing to determine that said first function is to be traced at said reduced tracing level.

9. The method of claim 2, said reduced tracing level comprising no tracing for said first function.

10. The method of claim 2, said first function being a first instance of said first function, said second function being a second instance of said first function.

11. The method of claim 2, said analyzing said plurality of tracer results being performed prior to tracing said first application.

12. The method of claim 2, said analyzing said plurality of tracer results being performed while tracing said first application.

13. The method of claim 2 further comprising:
    identifying a user classification, said user classification identifying a task objective for said set of user interactions, and identifying said first function as a low interest function within the user classification.

14. The method of claim 13 further comprising:
    identifying a second user classification, said second user classification identifying a second task objective for said set of user interactions, and identifying said first function as a high interest function within said second user classification.

15. A system comprising:
    at least one processor;
    a user analyzer executing on said at least one processor, said user analyzer that:
        receives a set of user interactions, said set of user interactions being gathered during a user session with a visualization, said visualization representing tracer data gathered by tracing an application with a tracer, said application comprising a plurality of functions;
        analyzes said set of user interactions to identify a first function as a low interest function; and
        causes said tracer to trace said first function at a reduced tracing level.

16. The system of claim 15, said user analyzer that further:
    analyzes said set of user interactions to identify a second function as a high interest function; and
    causes said tracer to trace said first function at an enhance tracing level.

17. The system of claim 16, said plurality of tracer results comprising tracer results from a plurality of different applications.

18. The system of claim 17, said plurality of tracer results comprising tracer results from said first application.

* * * * *